(12) United States Patent
Blume

(10) Patent No.: US 8,312,805 B1
(45) Date of Patent: Nov. 20, 2012

(54) HIGH PRESSURE PUMP PISTON

(75) Inventor: George H. Blume, Austin, TX (US)

(73) Assignee: Novatech Holdings Corp., Salt Lake City, UT (US)

( * ) Notice: Subject to any disclaimer, the term of this patent is extended or adjusted under 35 U.S.C. 154(b) by 796 days.

(21) Appl. No.: 12/390,518

(22) Filed: Feb. 23, 2009

Related U.S. Application Data

(63) Continuation-in-part of application No. 11/613,222, filed on Dec. 20, 2006, now abandoned, and a continuation-in-part of application No. 11/209,561, filed on Aug. 23, 2005, now Pat. No. 7,168,361, and a continuation-in-part of application No. 10/838,567, filed on May 4, 2004, now Pat. No. 6,957,605.

(51) Int. Cl.
*F16J 15/32* (2006.01)
*F16J 9/00* (2006.01)

(52) U.S. Cl. .......... 92/240; 277/560; 277/584; 277/589

(58) Field of Classification Search ............ 92/240, 92/241, 254; 277/436, 437, 438, 549, 550, 277/560, 584, 589
See application file for complete search history.

(56) References Cited

U.S. PATENT DOCUMENTS

| | | |
|---|---|---|
| 1,372,878 A | 3/1921 | Harder |
| 1,705,800 A | 3/1929 | Akeyson |
| 1,964,249 A | 11/1930 | Chase |
| 2,103,503 A | 12/1937 | White |
| 2,163,472 A | 6/1939 | Shimer |
| 2,473,064 A | 9/1945 | Leman |
| 2,435,948 A | 2/1948 | Wischhusen |
| 2,439,240 A | 4/1948 | Cummings |
| 2,621,017 A | 12/1952 | Yohpe |
| 2,627,259 A | 2/1953 | Wood et al. |
| 2,665,675 A | 1/1954 | Sheppard |
| 2,726,843 A | 12/1955 | Evans et al. |
| 2,903,235 A | 9/1959 | Rodgers et al. |
| 2,904,065 A | 9/1959 | Butlin |
| 2,949,127 A | 8/1960 | Malina |
| 3,053,500 A | 9/1962 | Atkinson |
| 3,054,422 A | 9/1962 | Napolitano |
| 3,070,120 A | 12/1962 | Wendt |
| 3,090,596 A | 5/1963 | Gifford |
| 3,107,895 A | 10/1963 | Vogeli |
| 3,127,905 A | 4/1964 | Vogeli |
| 3,164,364 A | 1/1965 | McColl |
| 3,174,718 A | 3/1965 | Bowen et al. |
| 3,191,617 A | 6/1965 | Maddox |
| 3,202,178 A | 8/1965 | Wolfe |
| 3,426,741 A | 2/1969 | Maagen |
| 3,433,250 A | 3/1969 | Hagihara |

(Continued)

*Primary Examiner* — Thomas E Lazo
(74) *Attorney, Agent, or Firm* — Gardere Wynne Sewell LLP

(57) ABSTRACT

A high pressure piston for use within a liner sleeve of a reciprocating pump comprises a dual-durometer elastomeric seal having first and second coaxial seal sections and, in certain embodiments, a circumferential bearing ring. Interactions of the seal components, including seal elastomers, result in stress redistribution within the seal which maintains sealing preload, with corresponding improved extrusion resistance and seal durability. When a bearing ring is present, a pump's pressure stroke causes at least a portion of the bearing ring to elastically expand radially to narrow or close the extrusion gap, thus tending to block elastomer extrusion by establishing sliding contact between the bearing ring's external surface and the liner. On the pump's return stroke the slightly wider extrusion gap allows cooling water directed generally toward the proximal flange of the piston hub to better cleanse, as well as cool, the liner wall.

35 Claims, 14 Drawing Sheets

U.S. PATENT DOCUMENTS

| | | | |
|---|---|---|---|
| 3,450,385 A | 6/1969 | Paptzun | |
| 3,483,885 A | 12/1969 | Leathers | |
| 3,518,742 A | 7/1970 | Merrill et al. | |
| 3,742,976 A | 7/1973 | Bailey | |
| 3,759,385 A | 9/1973 | Pouillon | |
| 3,770,009 A | 11/1973 | Miller | |
| 3,874,636 A | 4/1975 | Bake et al. | |
| 3,884,266 A | 5/1975 | Kondo | |
| RE29,299 E | 7/1977 | Estes et al. | |
| 4,053,166 A | 10/1977 | Domkowski | |
| 4,077,636 A | 3/1978 | Langford | |
| 4,099,706 A | 7/1978 | Steele, Jr. et al. | |
| 4,140,148 A | 2/1979 | Richter | |
| 4,180,097 A | 12/1979 | Sjoberg | |
| 4,194,527 A | 3/1980 | Schonwald et al. | |
| 4,222,126 A | 9/1980 | Boretos et al. | |
| 4,268,045 A | 5/1981 | Traub | |
| 4,270,440 A | 6/1981 | Lewis, II | |
| 4,281,590 A * | 8/1981 | Weaver | 92/240 |
| 4,307,140 A | 12/1981 | Davis | |
| 4,340,084 A | 7/1982 | Snow | |
| 4,408,629 A | 10/1983 | Lafont | |
| 4,508,315 A | 4/1985 | Livorsi et al. | |
| 4,516,785 A | 5/1985 | Miller et al. | |
| 4,518,329 A | 5/1985 | Weaver | |
| 4,529,006 A | 7/1985 | Block et al. | |
| 4,545,404 A | 10/1985 | Redwine | |
| 4,566,702 A | 1/1986 | Traub | |
| 4,597,367 A | 7/1986 | Hayashi | |
| 4,601,235 A | 7/1986 | Roberts | |
| 4,676,481 A | 6/1987 | Hayes | |
| 4,735,129 A | 4/1988 | Sjoberg | |
| 4,822,000 A | 4/1989 | Bramblet | |
| 4,832,769 A | 5/1989 | Shantz et al. | |
| 4,834,036 A | 5/1989 | Nishiyama et al. | |
| 4,842,287 A | 6/1989 | Weeks | |
| 4,860,995 A | 8/1989 | Rogers | |
| 4,876,126 A | 10/1989 | Takemura et al. | |
| 4,893,823 A * | 1/1990 | Strouse et al. | 277/584 |
| 4,915,355 A | 4/1990 | Fort | |
| 4,944,977 A | 7/1990 | Shantz et al. | |
| 4,951,707 A | 8/1990 | Johnson | |
| 5,029,811 A | 7/1991 | Yamamoto et al. | |
| 5,052,435 A | 10/1991 | Crudup et al. | |
| 5,062,452 A | 11/1991 | Johnson | |
| 5,082,020 A | 1/1992 | Bailey et al. | |
| 5,088,521 A | 2/1992 | Johnson | |
| 5,163,692 A * | 11/1992 | Schofield et al. | 277/436 |
| 5,176,170 A | 1/1993 | Boyesen | |
| 5,193,577 A | 3/1993 | de Koning | |
| 5,249,600 A | 10/1993 | Blume | |
| 5,253,987 A | 10/1993 | Harrison | |
| 5,275,204 A | 1/1994 | Rogers et al. | |
| 5,328,763 A | 7/1994 | Terry | |
| 5,345,965 A | 9/1994 | Blume | |
| 5,392,826 A | 2/1995 | Saville et al. | |
| 5,431,186 A | 7/1995 | Blume | |
| 5,458,314 A | 10/1995 | Bonesteel | |
| 5,480,163 A * | 1/1996 | Miser et al. | 277/437 |
| 5,535,784 A | 7/1996 | Saville et al. | |
| 5,538,029 A | 7/1996 | Holtgraver | |
| 5,865,442 A | 2/1999 | Iwashita | |
| 5,931,474 A | 8/1999 | Chang et al. | |
| 6,026,670 A | 2/2000 | Woulds | |
| 6,189,894 B1 | 2/2001 | Wheeler | |
| 6,206,376 B1 | 3/2001 | Hartman et al. | |
| 6,435,475 B1 | 8/2002 | Blume | |
| 6,679,477 B1 | 1/2004 | Blume | |
| 6,679,526 B2 | 1/2004 | Yamamoto et al. | |
| 6,955,181 B1 | 10/2005 | Blume | |
| 6,955,339 B1 | 10/2005 | Blume | |
| 6,957,605 B1 | 10/2005 | Blume | |
| 7,168,361 B1 | 1/2007 | Blume | |
| 7,168,440 B1 | 1/2007 | Blume | |
| 7,222,837 B1 | 5/2007 | Blume | |
| 7,513,483 B1 | 4/2009 | Blume | |
| 7,591,450 B1 | 9/2009 | Blume | |
| 7,641,175 B1 | 1/2010 | Blume | |
| 8,141,849 B1 | 3/2012 | Blume | |

* cited by examiner

HIGH PRESSURE PUMP PISTON

This is a continuation-in-part (CIP) patent application of copending application Ser. No. 11/613,222 having the filing date Dec. 20, 2006, which was a CIP of application Ser. No. 11/209,561 having the filing date Aug. 23, 2005 (now U.S. Pat. No. 7,168,361), which was a CIP of application Ser. No. 10/838,567 having the filing date May 4, 2004 (now U.S. Pat. No. 6,957,605).

FIELD OF THE INVENTION

The invention relates generally to high-pressure piston pumps used, for example, in oil field drilling operations.

BACKGROUND

Engineers typically design high-pressure oil field pumps (e.g., mud pumps) in two sections; the (proximal) power section (herein "power end") and the (distal) fluid section (herein "fluid end"). The power end usually comprises a crankshaft, reduction gears, bearings, connecting rods, crossheads, crosshead extension rods, etc. Also located in the power end of a mud pump is at least one liner within which a piston is moved in a reciprocating manner by a piston rod. Each liner comprises a cylindrical liner sleeve within a steel hull. Notwithstanding their location in the power end frame, liners, pistons and piston rods are considered part of a mud pump's fluid end.

Commonly used mud pump fluid ends also typically comprise a suction valve and a discharge valve associated with each liner (together with its piston and piston rod) in a sub-assembly, plus retainers and high-pressure seals, etc.

FIG. 1 schematically illustrates a cross-sectional view of a typical mud pump fluid end, showing its connection to a power end frame. A plurality of sub-assemblies similar to that illustrated in FIG. 1 may be combined in a mud pump.

FIG. 2A schematically shows a cross-section of a typical mud pump liner together with its piston and piston rod. High-pressure pump piston designs for mud pumps have evolved over several decades, as indicated in U.S. Pat. Nos. 2,473,064; 4,270,440; 4,516,785; 4,601,235; 4,735,129; and 5,480,163, each patent incorporated herein by reference. The designs illustrated in these patents cover a period of more than 50 years. Each incorporates one or more structural features for reducing or preventing extrusion under high pressure of a portion of the piston's elastomeric seal material (e.g., rubber, polyurethane or analogous resilient material) into a space between the piston and the liner sleeve wall (the "extrusion gap").

The extrusion gap, as shown schematically in FIG. 2A, typically arises because the outer diameter of the piston's steel hub is slightly smaller than the liner sleeve's inner diameter to permit reciprocating motion of the piston within the liner. As the liner sleeve wears the extrusion gap widens, increasing the tendency for sealing material to extrude into the gap under pressure (i.e., during a pump's pressure stroke). During extrusion, the sealing material is damaged or destroyed and the seal begins to fail. Eventually, failure of the seal leads to excessive leakage past the piston, followed by premature failure of the piston and/or the liner sleeve. The tendency of piston seal material to extrude into the gap under pressure is aggravated by the large amounts of frictional heat generated by movement of a tight-fitting piston seal on the liner sleeve wall. In earlier designs covering pistons fabricated with black rubber, the primary mode of failure was extrusion damage.

But circa 1985, the black rubber was replaced with polyurethane. Because of the relatively high strength and modulus of urethane, extrusion damage became a secondary mode of failure except in very high pressure applications, i.e., pressures greater than 5000 psi. The primary mode of failure then became frictional heat damage proximal to the lip of the urethane seal. And in dual-durometer seals (see below), shear-related elastomer fatigue emerged as a failure mode.

As FIG. 2B shows, the heat damage typically did not reach the extreme ends of the urethane seal because these ends remained somewhat cooler than the central section. In particular, the distal end of the urethane seal was cooled by its contact with the pumped fluid (e.g., drilling mud), while the proximal end of the urethane seal was cooled by heat transfer through the metal hub and also by water spray directed at the proximal end of the piston near the extrusion area. The central section of the seal was the locus of frictional wear and heat-related damage. And, unfortunately, shear-related elastomer fatigue failures also tended to occur in the central section of dual-durometer pistons such as that in FIG. 2B.

Failure to effectively remove frictional heat from the urethane seal central section tends to quickly degrade that portion of the seal and allow extrusion of seal material into the gap (described as a flow of elastomeric material under pressure in the '163 patent). As pieces of the resilient sealing material flowing into the gap are torn, cut and/or bitten off (see changes in the original profile of a dual-durometer urethane seal shown schematically in FIG. 2B), excessive leakage develops between piston and liner sleeve. Continued seal degradation may allow a piston flange to contact the liner sleeve wall and damage it. Finally, when wear from the frictional heat becomes excessive, the seal lip will reach a point where the lip has inadequate support; massive failure in which the lip folds back will follow. In light of these potential problems, patents are cited herein that describe various inventions to slow seal degradation by reducing the tendency of elastomeric seal material to flow into the gap and/or by eliminating the gap altogether through use of a structure that extends from the piston to the liner sleeve wall.

One long-used method of reducing elastomeric flow into the extrusion gap is by molding and/or bonding an elastomeric seal around a strong metal rib or flange that extends radially close to the gap (see, e.g., col. 2 of the '064 patent and col. 3 of the '163 patent). Adherence of the seal material to the metal near the gap is the extrusion control device because seal material bound to the metal can not flow. When elastomer adherence to the metal fails, seal material flows into the gap (i.e., seal extrusion) causing the seal to fail (i.e., to allow excessive leakage of the pumped fluid past the piston). Seal failure also allows the piston's metal rib or flange to contact the liner sleeve wall, often leading to galling and rapidly increasing liner sleeve wear.

Elastomeric flow through the extrusion gap may also be reduced when a portion of the elastomeric seal near the gap is reinforced by, for example, fabric (see, e.g., col. 4 of the '235 patent and col. 3 of the '129 patent). Reinforcement may also be provided through use of elastomers of different hardness in the piston seal (see, e.g., dual-durometer urethane seals such as the Dual-Duro (R) by Southwest Oilfield Products, Inc. and Green Duo dual-durometer products offered by National Oilwell Varco, Inc.). But dual-durometer seals are difficult and expensive to produce with uniformly predictable characteristics. In particular, failure of the seal bond at the interface between the harder and softer elastomers may lead to failure of the entire seal. Single-durometer seals reduce the problems of establishing and maintaining seal bonds, so they are less expensive to produce. And single-durometer seals perform adequately except in the presence of high-heat and/or high-pressure (e.g., except in areas near the extrusion gap), where elevated pressures and temperatures rapidly degrade them.

Another anti-extrusion piston seal embodiment includes a relatively rigid split ring (e.g., made from a metal such as steel or cast iron) which is bonded to an elastomeric seal that is intended to control expansion of the ring to ideally just "kiss" the liner sleeve, thus closing the extrusion gap (see, e.g., col. 5 of the '785 patent). Unfortunately, since a split ring will not radially expand uniformly around its entire circumference, ideal (i.e., complete) closure of the extrusion gap can not be obtained by practicing the invention of the '785 patent.

An alternative approach to blocking or reducing elastomeric flow is described in the '163 patent, wherein an annular flange combined with an axially-extending annular skirt forms a relatively rigid reinforcement section that prevents elastomeric material radially inward of the skirt from bulging outwardly towards the circumference of the piston (see, e.g., cols. 3 and 4 of the '163 patent). Elastomeric material radially outward of the skirt, on the other hand, is still subject to the elastomeric flow phenomenon noted above.

Yet another approach to high-pressure piston design features use of an annular gap filler ring with controlled radial creep characteristics which urge the ring into continuous contact with the liner sleeve such that an extrusion gap does not occur (see, e.g., col. 5 of the '440 patent). Glass-filled nylon is described as a material for the gap filler ring having the desired controlled radial creep characteristics (see, e.g., col. 6 of the '440 patent). But the continuous contact of the gap filler ring with the liner sleeve tends to quickly wear the liner sleeve's inner surface in a barrel shape (that is, having smaller diameters at the ends than in the middle). As liner sleeve wear continues, extraction of the piston through either end of the liner sleeve (with the gap filler ring remaining in constant liner sleeve wall contact) becomes increasingly difficult and may eventually become impossible.

The '440 patent also describes problems related to frictional heat due to the tremendous force of the piston seal on the liner sleeve wall. Dissipation of this heat is handled in the invention of the '440 patent by a plurality of water channels communicating a source of fluid from a passageway within the piston body to the liner for washing and cooling (see, e.g., cols. 1, 2 and 7 of the '440 patent). It is also common practice merely to direct a stream of water at the back of the piston for combined cooling and washing of the piston and liner sleeve wall.

The problems associated with frictional heat build-up between high-pressure pistons and liner sleeves are exacerbated by higher operating pressures and also by newer liner sleeves comprising ceramic and zirconium. Both ceramic and zirconium offer excellent corrosion resistance and a 300-400% increase in wear life over traditional hardened steel liner sleeves. But both materials are very expensive and very brittle, and they have the additional disadvantage of having lower thermal conductivity than steel. Their lower thermal conductivity means that they tend to retain the substantial frictional heat that develops when a piston with its tight-fitting seal reciprocates within a liner sleeve. This retained heat results in increased piston operating temperatures. And with prolonged exposure to retained heat, elastomeric piston seal materials (particularly urethanes) are progressively degraded. Subsequent seal failures eventually allow pistons to damage the liner sleeves in which they reciprocate, as noted above. The likelihood of such damage is relatively lower with use of liner sleeves having better thermal conductivity and/or with pistons having lower coefficients of friction with a liner. In the former case, the liner sleeve tends to more effectively remove heat from the piston seal-liner sleeve interface, and in the latter case less heat is generated at the interface.

Compounding the problems with frictional heat retention in pistons and liner sleeves is the fact that the designs of currently available piston seals evolved during a time when typical mud pump working pressures were about 2,000 to 4,000 pounds per square inch (psi). Modern mud pumps, which operate at pressures two to three times as high, require further evolution in high-pressure piston/piston-seal design and construction.

SUMMARY

The invention relates to pistons and piston hub and seal assemblies with dual-durometer seals which offer substantial advantages over earlier designs in high-pressure pumps. A first embodiment of a piston hub and seal assembly has a longitudinal axis. The piston hub and seal assembly comprises a piston hub substantially symmetrical about the longitudinal axis, the piston hub having at least one circumferential seal retention area. The piston hub and seal assembly further comprises an elastomeric seal cast-in-place in at least one circumferential seal retention area, each elastomeric seal also being substantially symmetrical about the longitudinal axis.

The elastomeric seal has structural features and functions related in part to those of seals described elsewhere for use in valves. Thus, while this application is a CIP of the piston-related applications and patents noted above, the invention described herein is also related to the family that includes copending U.S. Ser. No. 11/219,261, which was filed Sep. 2, 2005, which was a CIP of U.S. Ser. No. 10/179,804 which was filed Jun. 25, 2002 (now U.S. Pat. No. 6,955,181), which was a CIP of U.S. Ser. No. 09/836,043 which was filed Apr. 16, 2001 (now abandoned).

In the dual-durometer piston hub and seal assemblies described herein, the relatively harder elastomers suitable for the first (i.e., the more peripheral) seal section typically exhibit good extrusion resistance but relatively little beneficial preload memory to facilitate their sealing against a cylinder (e.g., a liner sleeve wall within the hull of a liner). Elastomers for the second seal section (which is generally closer to the piston hub than the first seal section) are chosen to be relatively softer than elastomers for the first seal section. Being softer, these second seal section elastomers also exhibit relatively greater memory for maintaining beneficial sealing preload which is developed as the seals are cast-in-place. As described herein, the resulting cast-in-place dual-durometer seals have a combination of functional structures and advantageous performance characteristics that are not found in conventional seals, whether single-durometer or dual-durometer.

Certain of the advantageous performance characteristics of dual-durometer piston hub and seal assemblies described herein are not found in conventional seals because the first seal sections described herein employ substantially harder elastomers than those typically found in conventional seals. These harder elastomers are significantly more resistant to extrusion damage, but they generally can't be used in conventional seal designs, in part because of their poor preload memory. In piston hub and seal assemblies described herein, however, preload memory is augmented by the second seal sections acting through the intra-seal interface. Indeed, in certain embodiments described herein such preload memory augmentation is sufficiently effective to allow the use of elastomers in first seal sections that are so hard they obviate the need for the extrusion damage resistance otherwise provided by embedded bearing rings. An example of such an embodiment is described herein as the first embodiment (see FIG. 3), wherein an embedded bearing ring in the first seal section is unnecessary, the first seal section effectively serving as its own bearing ring. But with the increasingly common exposure of seals to extreme drilling pressures (seen as drilling for oil becomes more demanding) the use of a bearing ring as shown in FIG. 4 may nevertheless be necessary.

The elastomeric seal of the above first embodiment piston hub and seal assembly comprises a first seal section having a cylindrical external surface portion adjacent to a frusto-conical external surface portion. The frusto-conical external surface portion typically comprises a peripheral seal lip, and the first seal section comprises a first polyurethane. The elastomeric seal further comprises a second seal section, at least a portion of the second seal section lying radially between one circumferential seal retention area and at least a portion of the first seal section. The second seal section contacts the first seal section along a substantially non-planar intra-seal interface, and the second seal section comprises a second polyurethane having a lower modulus than the first polyurethane. Such an elastomeric seal is described herein as a dual-durometer seal because the lower modulus polyurethane of the second seal section is characterized by lower durometer values (reflecting lower hardness) than the polyurethane of the first seal section. Note that a dual-durometer seal as described herein may comprise one or more substantially or partially non-elastomeric components (e.g., a metallic bearing ring).

In the above first embodiment piston hub and seal assembly, the first seal section frusto-conical external surface portion is angled outwardly about 3 degrees to about 7 degrees with respect to the adjacent first seal section cylindrical external surface portion. Also in the first embodiment piston hub and seal assembly, the intra-seal interface is substantially non-planar. Being non-planar means that the intra-seal interface comprises a non-planar portion (in this case, a cylindrical portion substantially coaxial with the first seal section cylindrical external surface portion). As explained herein, radial force transmitted from the second seal section to the first seal section is substantially normal to the cylindrical portion of the intra-seal interface, thus minimizing transmission of shear force across the intra-seal interface.

Minimized transmission of shear force across the intra-seal interface may be seen in the embodiments described herein as follows. In these embodiments the relatively lower modulus of the polyurethane of the second seal section (relative to the polyurethane of the first seal section) allows the second seal section to substantially hydraulically redistribute force transmitted across the intra-seal interface. For example, force secondary to circumferential compression of a seal lip within a liner sleeve, which is transmitted across the intra-seal interface from the first seal section to the second seal section, is hydraulically redistributed in the second seal section and then retransmitted from the second seal section to the first seal section. This retransmitted force will have a substantial component normal to at least a portion of the intra-seal interface, while any shear component(s) of retransmitted force will be relatively smaller than the normal component. Such relatively smaller retransmitted shear force component(s) will thus tend to minimize disadvantageous shear-related elastomer fatigue failures at or near the intra-seal interface, thereby tending to lengthen seal service life.

Such minimization of shear force transmission across the intra-seal interface is also advantageous in the piston hub and seal assemblies described herein because it reduces or eliminates the need for bonding strength at the intra-seal interface, thus making such bonding optional in certain embodiments.

These advantages contrast with the characteristics of earlier (conventional) dual-durometer seal designs where the interface between seal components of differing durometer is substantially planar (see, e.g., FIG. 2B). Such substantially planar interfaces are typically subject to residual shrinkage stresses generated as the seal components cure at different times and/or at different rates, as well as cyclic shear stresses described herein. Further, these residual and cyclic stresses combine with still other shear stresses associated with differing frictional forces acting on seal components having differing moduli as a piston reciprocates in a liner sleeve. Such combinations of multiple shear stresses tend to fatigue the seal materials near the planar interface and/or elsewhere in the seal, which can lead to premature seal failure.

In conventional dual-durometer seals, elastomer fatigue occurred because of the cyclic pressurization/depressurization of both harder and softer elastomer sections of dual-durometer pistons. During a piston pressure stroke, the pumped fluid hydraulically pressurizes the relatively softer elastomer that comprises the seal lip. Under high pressure, the softer elastomer then hydraulically pressurizes the relatively harder elastomer of the dual-durometer seal. But the harder and softer elastomers react differently to the hydraulic pressure acting on them. The softer elastomer is pressed radially against the liner sleeve, while the harder elastomer offers greater resistance to being pressed radially against the liner sleeve (due to its higher modulus). Thus, when similar hydraulic pressure is applied to both the softer and harder elastomers, the softer elastomer tends to move radially to a greater extent than the harder elastomer. This differential radial movement creates shear stress at the substantially planar interface between the harder and softer elastomers, the planar interface being substantially parallel to the directions of the radial movements of the two elastomers. Thus, the orientation of the substantially planar interface tends to maximize the elastomer shear stress which reappears at or near the interface with each piston pressure stroke. Such cyclic exposure to shear stress predisposes to shear-related elastomer fatigue failures.

Shear-related elastomer fatigue failures are reduced or eliminated in embodiments of a piston hub and seal assembly described herein as in the following second embodiment. This embodiment of a piston hub and seal assembly also has a longitudinal axis and exhibits the above-described advantages over earlier designs. In this second embodiment, the piston hub and seal assembly again comprises a piston hub substantially symmetrical about the longitudinal axis, the piston hub having at least one circumferential seal retention area. And the second embodiment piston hub and seal assembly further comprises an elastomeric seal cast-in-place in at least one circumferential seal retention area, each elastomeric seal being substantially symmetrical about the longitudinal axis.

In the above second embodiment piston hub and seal assembly, the elastomeric seal comprises a first seal section having a cylindrical external surface portion adjacent to a frusto-conical external surface portion, the first seal section comprising a first polyurethane. The elastomeric seal further comprises a second seal section, at least a portion of the second seal section lying radially between one circumferential seal retention area and at least a portion of the first seal section. The second seal section contacts the first seal section along a substantially non-planar intra-seal interface, and the second seal section comprises a second polyurethane having a lower modulus than the first polyurethane.

In the second embodiment piston hub and seal assembly the elastomeric seal additionally comprises a circumferential bearing ring partially embedded coaxially in the first seal section, the circumferential bearing ring having a cylindrical external surface portion. The circumferential bearing ring may comprise various bearing materials (including, for example, lubricant-filled polymer and/or bronze).

Further in the second embodiment piston hub and seal assembly, the first seal section frusto-conical external surface portion peripherally comprises a seal lip and is angled outwardly about 3 degrees to about 7 degrees with respect to the adjacent first seal section cylindrical external surface portion. Also in the second embodiment piston hub and seal assembly, the intra-seal interface comprises a frusto-conical portion substantially coaxial with said first seal section cylindrical external surface portion.

The invention also includes a piston within a cylinder, wherein the piston comprises one of the piston hub and seal assemblies described herein. The piston lies, for example, within the liner sleeve of a liner.

Also in various embodiments of the piston hub and seal assemblies described herein, the first and second seal sections may be bonded to at least one circumferential seal retention area of a hub (i.e., hub-bonded). Alternatively in replacement cup configurations, neither the first nor the second seal sections are bonded to the hub, the seal being held in place with respect to the hub by a retainer plate. The retainer plate, in turn, being held in place with respect to the hub by a piston rod and piston rod nut. Further, the first seal section first polyurethane may be either bonded, or alternatively not bonded, to the second seal section second polyurethane along the intra-seal interface. Still further, the first seal section may comprise polyurethane of about 95 durometer Shore A hardness to about 60 durometer Shore D hardness, while the second seal section may comprise polyurethane of about 75 to about 85 durometer Shore A hardness. And in certain embodiments of a piston hub and seal assembly, at least one void, or alternatively no void, extends radially between a portion of the second seal section and the circumferential seal retention area.

In each of the piston hub and seal assembly embodiments described herein, the first and second seal sections may be cast-in-place using certain methods to obtain desired seal properties. For example, the second seal section may be allowed to completely cure before the first seal section is cast in contact with it. Under such conditions, the first seal section will typically shrink tightly around the second seal section during curing, thus compressing the second seal section. After curing of both the first and second elastomeric seal sections, two types of preload will then exist when such a hub and seal assembly is inserted in a liner sleeve. The first preload type will be due to radial compression of the first seal section's seal lip by contact with the liner sleeve. And the second preload type will be due to force transmitted radially outward from the compressed second seal section to the first seal section. While the magnitude of the first preload type may decrease over time due to frictional wear and heating of the first seal section, the magnitude of the second preload will tend to remain substantially constant because the second seal section is substantially protected from both frictional wear and heat by the presence of the first seal section. Thus, the first and second seal sections will function synergistically to maintain an effective preload level necessary for pumping efficiency throughout the service life of a hub and seal assembly.

Such synergistic seal function represents an improvement in elastomeric seal performance over that obtainable with a seal that comprises a single seal section that is cast-in-place and cured in direct contact with a piston hub (i.e., a single-durometer seal). In such a single-durometer seal, relatively high residual shrinkage stress tends to develop in the seal elastomer as it cures, and this stress contributes to a residual beneficial preload for the seal. Such residual preload initially is useful for improving sealing against a liner sleeve. But this benefit tends to diminish rapidly in use because the substantial frictional wear and heating experienced by the seal during high-pressure pumping tends to soften the seal elastomer, reduce its resting diameter (especially in the central section), and leave it with little memory of the earlier-developed residual preload (see, e.g., FIG. 2B).

In contrast, the dual-durometer piston hub and seal assemblies described herein include the presence of a relatively compliant second seal section between one or more portions of the first seal section and the piston hub. The higher compliance of the second seal section tends to be associated with better memory of the preload developed within it during curing. And since the second seal section is radially within the intra-seal interface, it is closer to the relatively cool piston hub than the first seal section. So even though the first seal section tends to lose much of its initial preload due to frictional heating and wear, the second seal section preload is substantially maintained and continues to be transmitted radially across the intra-seal interface to augment sealing of a first seal section seal lip against a cylinder (e.g., a liner sleeve within the hull of a liner).

The maintenance of adequate preload described above for the first seal section may also affect the performance of one or more circumferential bearing rings that may be embedded in the elastomer of the first seal section. Bearing rings having a cylindrical external surface portion may, for example, be metallic (e.g., comprising bronze) or filled-polymeric (e.g., comprising polyamide and molybdenum disulfide). Filled-polymeric bearing rings generally have significantly lower coefficients of friction on liner sleeves than metallic bearing rings and therefore develop less frictional heat. Metallic bearing rings have relatively high heat conductivity compared to filled-polymeric bearing rings (and higher heat conductivity than that of the liner sleeve and the elastomeric seal as well), and thus can carry frictional heat away from the peripheral bearing ring contact surface. Further, at least the proximal portion of both metallic and filled-polymer bearing rings has a relatively low modulus of elasticity compared to the liner sleeve wall to facilitate its radial expansion for narrowing the width of the extrusion gap between the bearing ring and the liner sleeve wall.

On the pump's pressure stroke the proximal portion of the bearing ring experiences a substantially uniformly distributed net outward radial force on its inner surface, the force being transmitted substantially hydraulically via seal elastomer. Such an outward radial force causes the proximal portion of the bearing ring to expand radially, thereby narrowing the extrusion gap. The extrusion gap narrows because the liner sleeve wall has a relatively higher modulus of elasticity than the proximal portion of the bearing ring. Thus, the liner sleeve inner diameter expands to a lesser extent than the proximal portion of the bearing ring in response to the pump's pressure stroke. When the extrusion gap is thus narrowed on the pressure stroke, the tendency for elastomeric seal extrusion under pressure is reduced. Simultaneously, in the case of metallic bearing rings, the relatively high heat conductivity of the bearing ring allows effective scavenging of frictional heat (which is generated predominately during the pressure stroke) from the vicinity of the extrusion gap. Filled-polymeric bearing rings have relatively lower heat conductivity than metallic bearing rings and lower coefficients of friction with the liner sleeve. Thus, filled-polymeric bearing rings conduct less frictional heat than metallic bearing rings, but they also generate less frictional heat.

Under reduced pressure on the pump's return stroke, the proximal portion of a bearing ring having a cylindrical external surface portion (or the entire length of a cylindrical bearing ring) tends to elastically contract to a smaller diameter. This elastic bearing ring contraction is typically greater in a metallic bearing ring than in a filled polymer bearing ring, but in either case tends to reverse the above-noted narrowing of the extrusion gap (that is, on the pump's return stroke the extrusion gap tends to widen). In turn, the widened gap (in combination with reduced pressure on the elastomeric seal during the return stroke) reduces frictional heat generation in and near the gap. The slightly wider extrusion gap during the return stroke also allows water sprayed generally at the back of the piston to better cleanse the liner sleeve wall of particulate matter from the pumped fluid, while at the same time cooling the piston back as well as piston and liner surfaces near the gap. The result is increased piston seal service life and reduced liner sleeve wear, leading to better overall pump performance.

DETAILED DESCRIPTION OF ILLUSTRATED EMBODIMENTS

Figure 3:
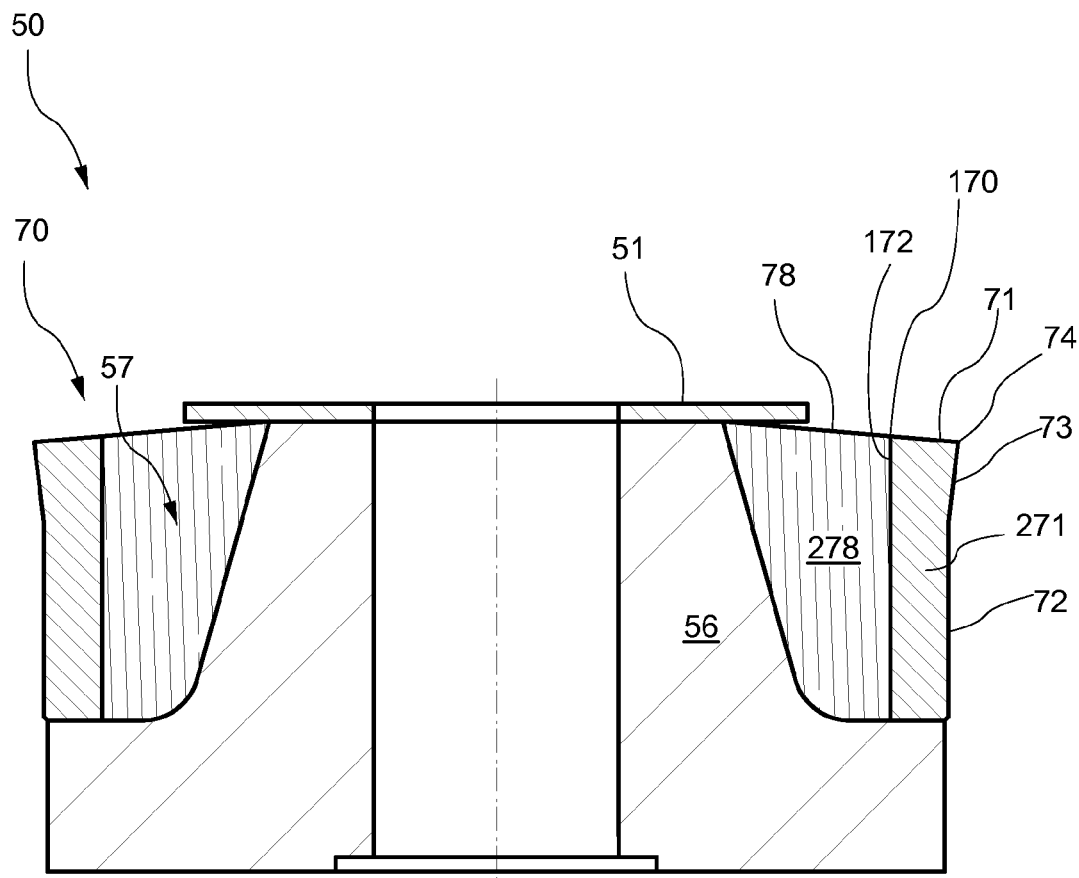
FIG. 3 is a longitudinal cross-sectional schematic view of a piston hub and seal assembly (dual-durometer seal, replacement cup configuration, without a bearing ring but with a retainer plate).

A first embodiment piston hub and seal assembly 50 has a longitudinal axis and a dual-durometer seal in a replacement cup configuration (see FIG. 3). Piston hub and seal assembly 50 comprises a piston hub 56 substantially symmetrical about the longitudinal axis, piston hub 56 having at least one circumferential seal retention area 57. Piston hub and seal assembly 50 further comprises an elastomeric seal 70 cast-in-place in circumferential seal retention area 57, elastomeric seal 70 also being substantially symmetrical about the longitudinal axis.

Elastomeric seal 70 comprises a first seal section 71 having a cylindrical external surface portion 72 adjacent to a frusto-conical external surface portion 73, first seal section 71 comprising a first polyurethane 271. Frusto-conical external surface portion 73 peripherally comprises a seal lip 74. Elastomeric seal 70 further comprises a second seal section 78, at least a portion of second seal section 78 lying radially between first seal section 71 and circumferential seal retention area 57. Second seal section 78 contacts first seal section 71 along a substantially non-planar intra-seal interface 170, second seal section 78 comprising a second polyurethane 278 having a lower modulus than first polyurethane 271.

In the first embodiment piston hub and seal assembly 50, first seal section frusto-conical external surface portion 73 is angled outwardly about 3 degrees to about 7 degrees with respect to the adjacent first seal section cylindrical external surface portion 72. Also in the first embodiment piston hub and seal assembly 50, intra-seal interface 170 comprises a cylindrical portion 172 substantially coaxial with first seal section cylindrical external surface portion 72 (and with piston hub 56).

Figure 4:
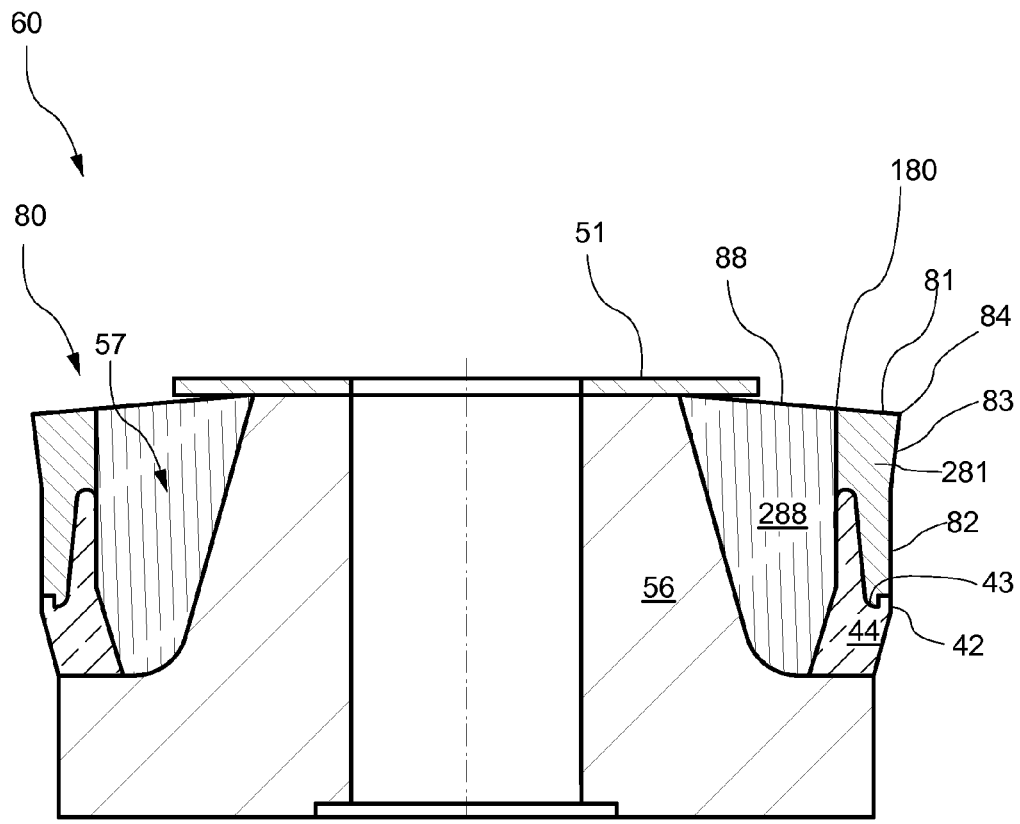
FIG. 4 is a longitudinal cross-sectional schematic view of a piston hub and seal assembly (dual-durometer seal, replacement cup configuration, with both a bearing ring and a retainer plate).

A second embodiment piston hub and seal assembly 60 has a longitudinal axis and a dual-durometer seal in a replacement cup configuration (see FIG. 4). This second embodiment piston hub and seal assembly 60 again comprises a piston hub 56 substantially symmetrical about the longitudinal axis, piston hub 56 having at least one circumferential seal retention area 57. And piston hub and seal assembly 60 further comprises an elastomeric seal 80 cast-in-place in circumferential seal retention area 57, elastomeric seal 80 being substantially symmetrical about the longitudinal axis.

Figure 1:
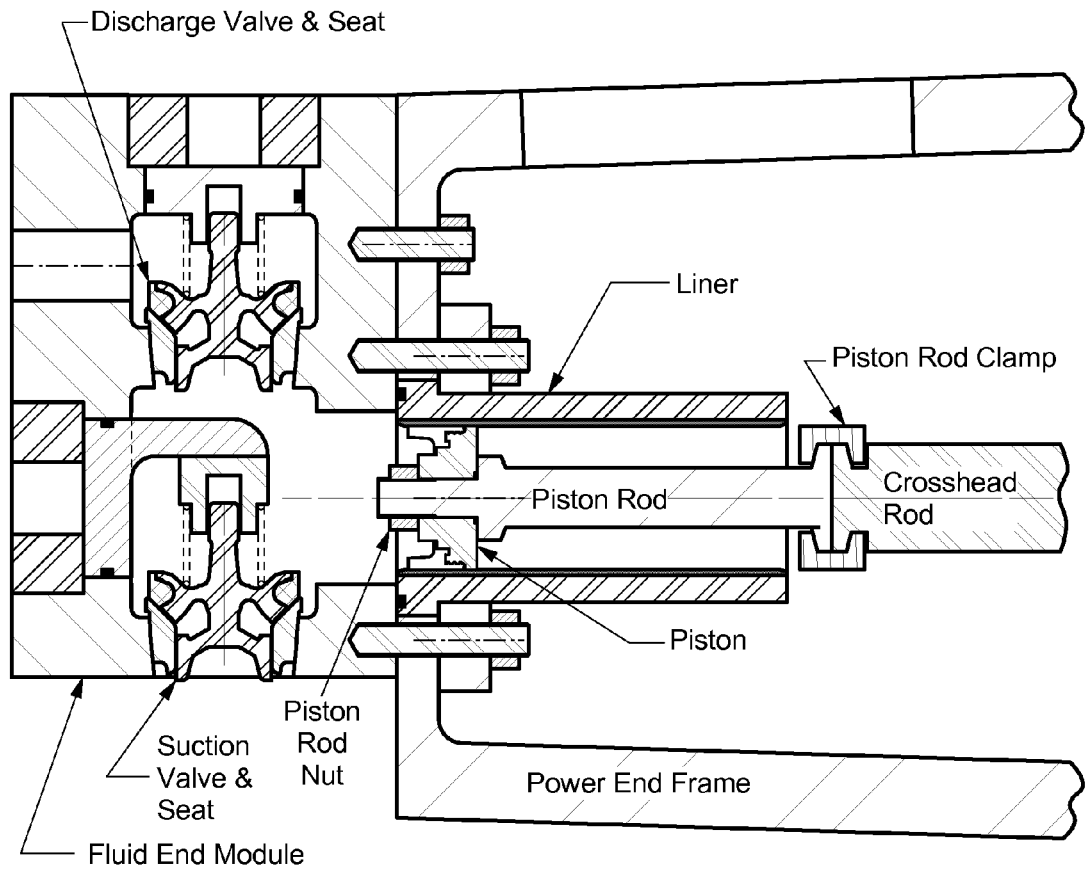
FIG. 1 is a cross-sectional schematic view of a typical mud pump fluid end housing showing its connection to a power end frame.
Figure 2A:
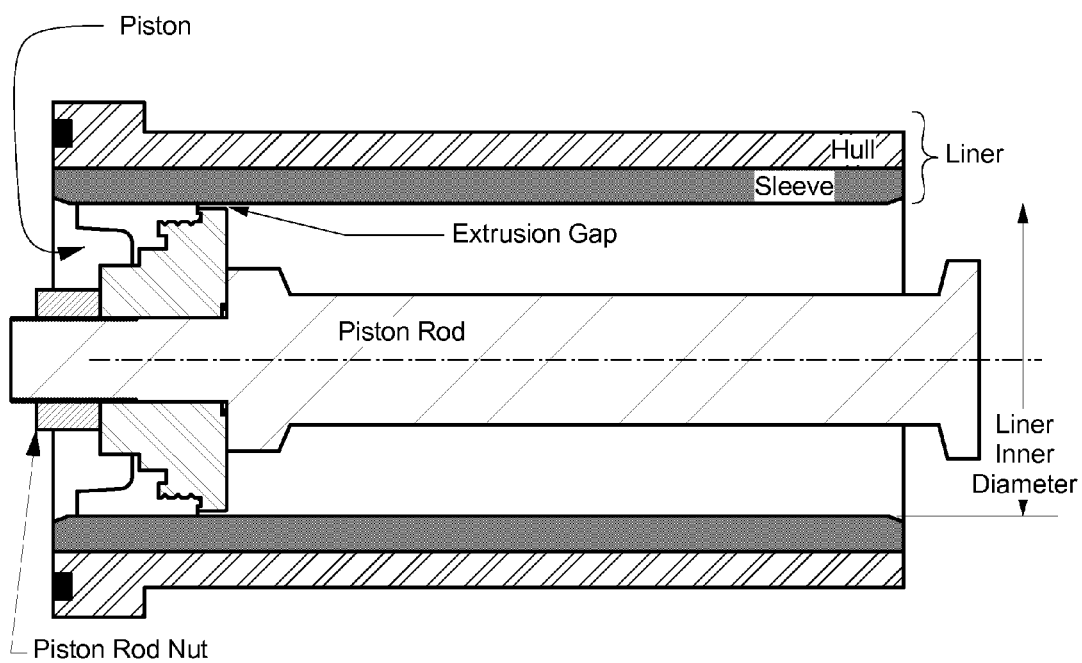
FIG. 2A schematically illustrates a cross-section of a typical mud pump liner and piston.
Figure 2B:
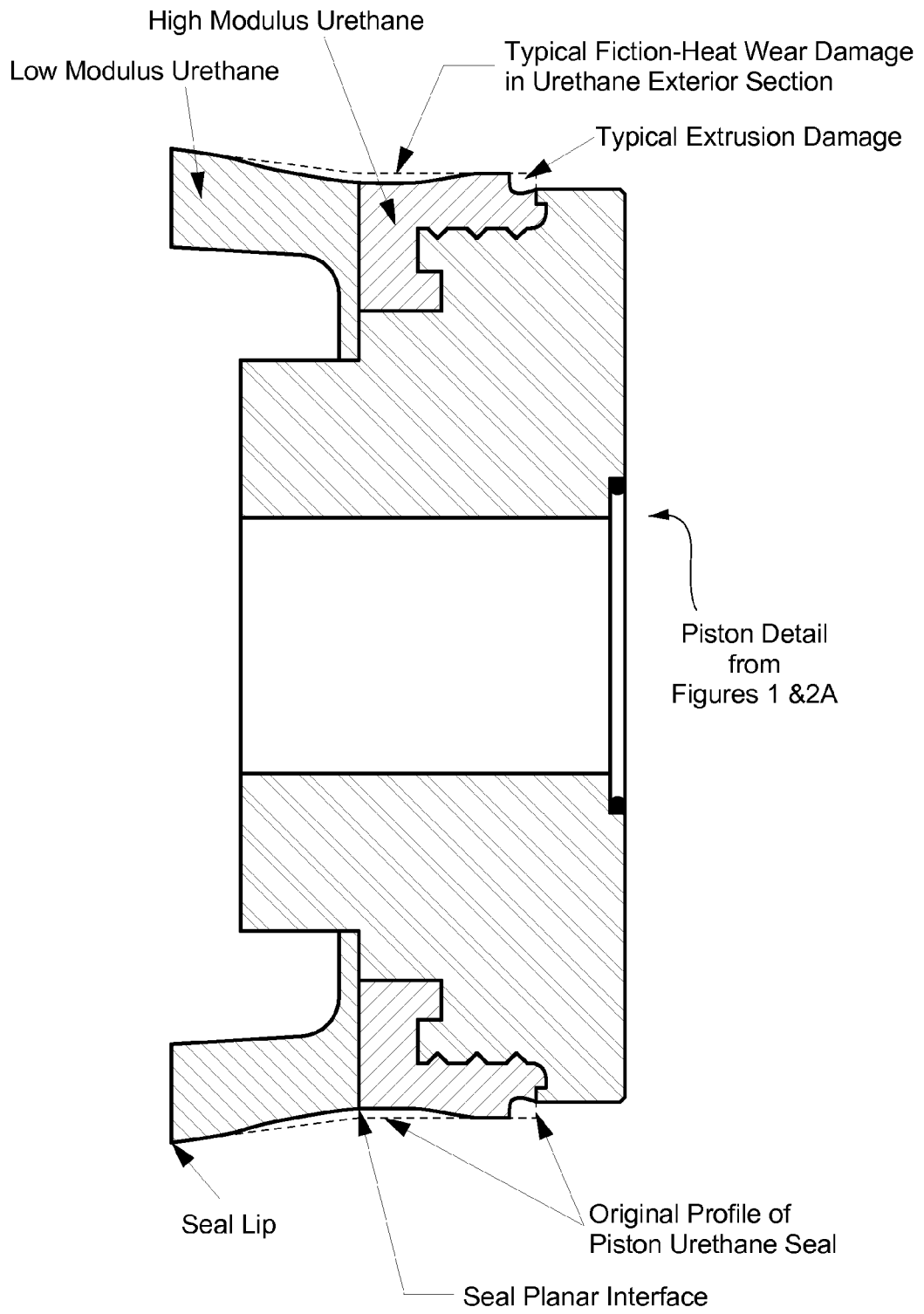
FIG. 2B schematically shows the central location of typical patterns elastomer shear stress and of frictional heat and wear damage to a conventional dual-durometer urethane seal.

As described herein, piston hub and seal assembly 50 (or 60) may be installed on a piston rod (see, e.g., FIG. 1) to form a piston. As a part of this installation, elastomeric seal 70 (or 80) is typically held in place on hub 56 by hub 56 itself and by retainer plate 51, retainer plate 51 then being secured on the piston rod by a piston rod nut (see, e.g., FIG. 1). Note the wedge-shaped gap between retainer plate 51 and a portion of elastomeric seal 70 (or 80). This wedge-shaped gap allows longitudinal expansion of the elastomeric seal when the seal is peripherally compressed by insertion in a liner sleeve.

In piston hub and seal assembly 60, elastomeric seal 80 comprises a first seal section 81 having a cylindrical external surface portion 82 adjacent to a frusto-conical external surface portion 83, first seal section 81 comprising a first polyurethane 281. Frusto-conical external surface portion 83 peripherally comprises a seal lip 84. Elastomeric seal 80 further comprises a second seal section 88, at least a portion of second seal section 88 lying radially between first seal section 81 and circumferential seal retention area 57. Second seal section 88 contacts first seal section 81 along an intra-seal interface 180, and second seal section 88 comprises a second polyurethane 288 having a lower modulus than the first polyurethane 281.

In second embodiment piston hub and seal assembly 60, elastomeric seal 80 additionally comprises a circumferential bearing ring 44 partially embedded coaxially in first seal section 81, circumferential bearing ring 44 having a cylindrical external surface portion 42. Circumferential bearing ring 44 may comprise various bearing materials (including, for example, bronze and/or lubricant-filled polymer).

Further in second embodiment piston hub and seal assembly 60, first seal section frusto-conical external surface portion 83 is angled outwardly about 3 degrees to about 7 degrees with respect to first seal section cylindrical external surface portion 82. Also in piston hub and seal assembly 60, intra-seal interface 180 comprises a cylindrical portion substantially coaxial with said first seal section cylindrical external surface portion 82 (and with piston hub 56).

Figure 5A:
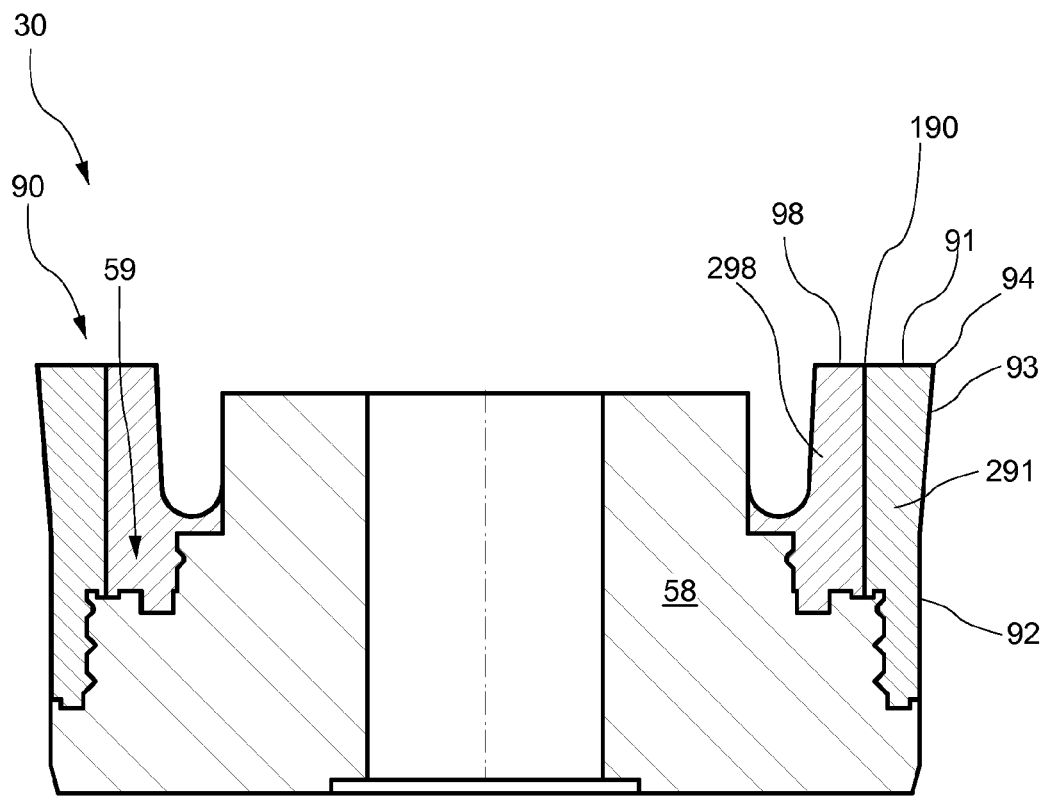
FIG. 5A is a longitudinal cross-sectional schematic view of a piston hub and seal assembly (dual-durometer seal with cylindrical intra-seal interface, and hub-bonded piston configuration not requiring a retainer plate).

A third embodiment piston hub and seal assembly 30 has a longitudinal axis and a dual-durometer seal in a hub-bonded piston configuration (see FIG. 5A). The third embodiment piston hub and seal assembly 30 comprises a piston hub 58 substantially symmetrical about the longitudinal axis, piston hub 58 having at least one circumferential seal retention area 59. And piston hub and seal assembly 30 further comprises an elastomeric seal 90 cast-in-place in the circumferential seal retention area 59, elastomeric seal 90 being substantially symmetrical about the longitudinal axis.

In third embodiment piston hub and seal assembly 30, elastomeric seal 90 comprises a first seal section 91 having a cylindrical external surface portion 92 adjacent to a frusto-conical external surface portion 93, first seal section 91 comprising a first polyurethane 291 under residual shrinkage stress. Frusto-conical external surface portion 93 peripherally comprises a seal lip 94. Elastomeric seal 90 further comprises a second seal section 98, at least a portion of second seal section 98 lying radially between first seal section 91 and circumferential seal retention area 59. Second seal section 98 contacts first seal section 91 along a substantially non-planar intra-seal interface 190, and second seal section 98 comprises a second polyurethane 298 under residual shrinkage stress and having a lower modulus than first polyurethane 291. At least a portion of first seal section 91 is bonded to a portion of circumferential seal retention area 59. Further, at least a portion of second seal section 98 is also bonded to a portion of circumferential seal retention area 59.

Figure 5B:
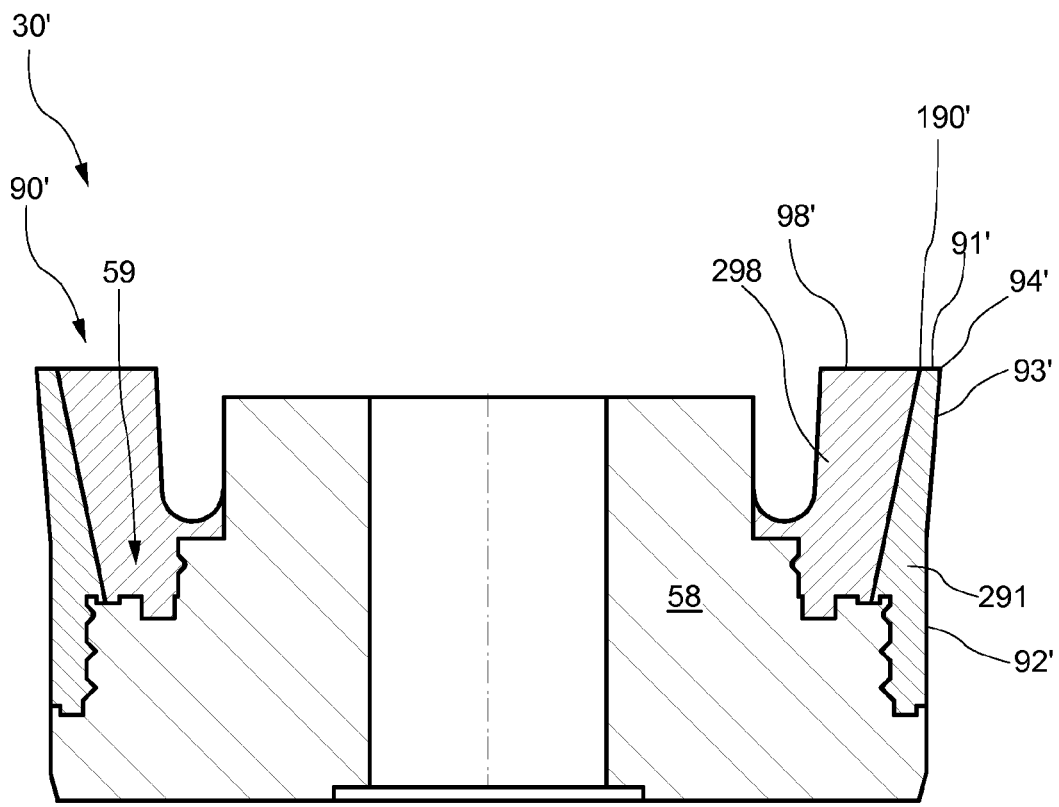
FIG. 5B is a longitudinal cross-sectional schematic view of a piston hub and seal assembly (dual-durometer seal with frusto-conical intra-seal interface, and hub-bonded piston configuration not requiring a retainer plate).

A fourth embodiment piston hub and seal assembly 30' is closely related to third embodiment piston hub and seal assembly 30, having a longitudinal axis and a dual-durometer seal in a hub-bonded piston configuration (see FIG. 5B). The fourth embodiment piston hub and seal assembly 30' comprises a piston hub 58 substantially symmetrical about the longitudinal axis, piston hub 58 having at least one circumferential seal retention area 59. And piston hub and seal assembly 30' further comprises an elastomeric seal 90' cast-in-place in the circumferential seal retention area 59, elastomeric seal 90' being substantially symmetrical about the longitudinal axis.

In fourth embodiment piston hub and seal assembly 30', elastomeric seal 90' comprises a first seal section 91' having a cylindrical external surface portion 92' adjacent to a frusto-conical external surface portion 93', first seal section 91' comprising a first polyurethane 291 under residual shrinkage stress. Frusto-conical external surface portion 93' peripherally comprises a seal lip 94'. Elastomeric seal 90' further comprises a second seal section 98', at least a portion of second seal section 98' lying radially between first seal section 91' and circumferential seal retention area 59. Second seal section 98' contacts first seal section 91' along a substantially non-planar intra-seal interface 190' coaxial with piston hub 58, and second seal section 98' comprises a second polyurethane 298 having a lower modulus than first polyurethane 291. Intra-seal interface 190' is substantially non-planar because (as shown) it comprises a frusto-conical portion substantially coaxial with first seal section cylindrical external surface portion 92'. At least a portion of first seal section 91' is bonded to a portion of circumferential seal retention area 59. Further, at least a portion of second seal section 98' is also bonded to a portion of circumferential seal retention area 59.

In third embodiment piston hub and seal assembly 30, first seal section frusto-conical external surface portion 93 is angled outwardly about 3 degrees to about 7 degrees with respect to first seal section cylindrical external surface portion 92. Also in third embodiment piston hub and seal assembly 30, intra-seal interface 190 is substantially non-planar because it comprises a cylindrical portion (shown), this portion being substantially coaxial with first seal section cylindrical external surface portion 92. In fourth embodiment piston hub and seal assembly 30', first seal section frusto-conical external surface portion 93' is angled outwardly about 3 degrees to about 7 degrees with respect to first seal section cylindrical external surface portion 92'. Also in fourth embodiment piston hub and seal assembly 30', intra-seal interface 190' is substantially non-planar because it comprises a frusto-conical portion (shown), this portion being substantially coaxial with first seal section cylindrical external surface portion 92'.

Note that in third embodiment piston hub and seal assembly 30 and fourth embodiment piston hub and seal assembly 30', both the first and second seal sections are under residual shrinkage stress. In both embodiments, the respective second seal sections are cast-in-place (including curing) initially, followed by later casting-in-place of the respective first seal sections. As the respective first seal sections cure, they tend to shrink tightly around the respective second seal sections. This shrinkage causes residual shrinkage stress to persist in the first and second seal sections of both third and fourth embodiments. However, the first seal sections of both third and fourth embodiments comprise polyurethane of relatively higher modulus than the respective second seal sections. Thus, the polyurethane of the first seal sections has relatively poorer memory of residual shrinkage stress than the polyurethane of the respective second seal sections. Further, the polyurethane of the first seal sections is closer to a liner sleeve than the polyurethane of the respective second seal sections. So the polyurethane of the first seal sections is more subject to frictional heating and wear than the polyurethane of the respective second seal sections. Frictional heating and wear thus tend to degrade (i.e., reduce) residual shrinkage stress in first seal sections to a greater extent than in the respective (relatively protected) second seal sections. As noted above, the residual shrinkage stress of a protected second seal section can then contribute materially to beneficial preload available to achieve good sealing of a piston hub and seal assembly within a liner sleeve, even after significant degradation of the residual shrinkage stress in the respective first seal section.

Figure 6A:
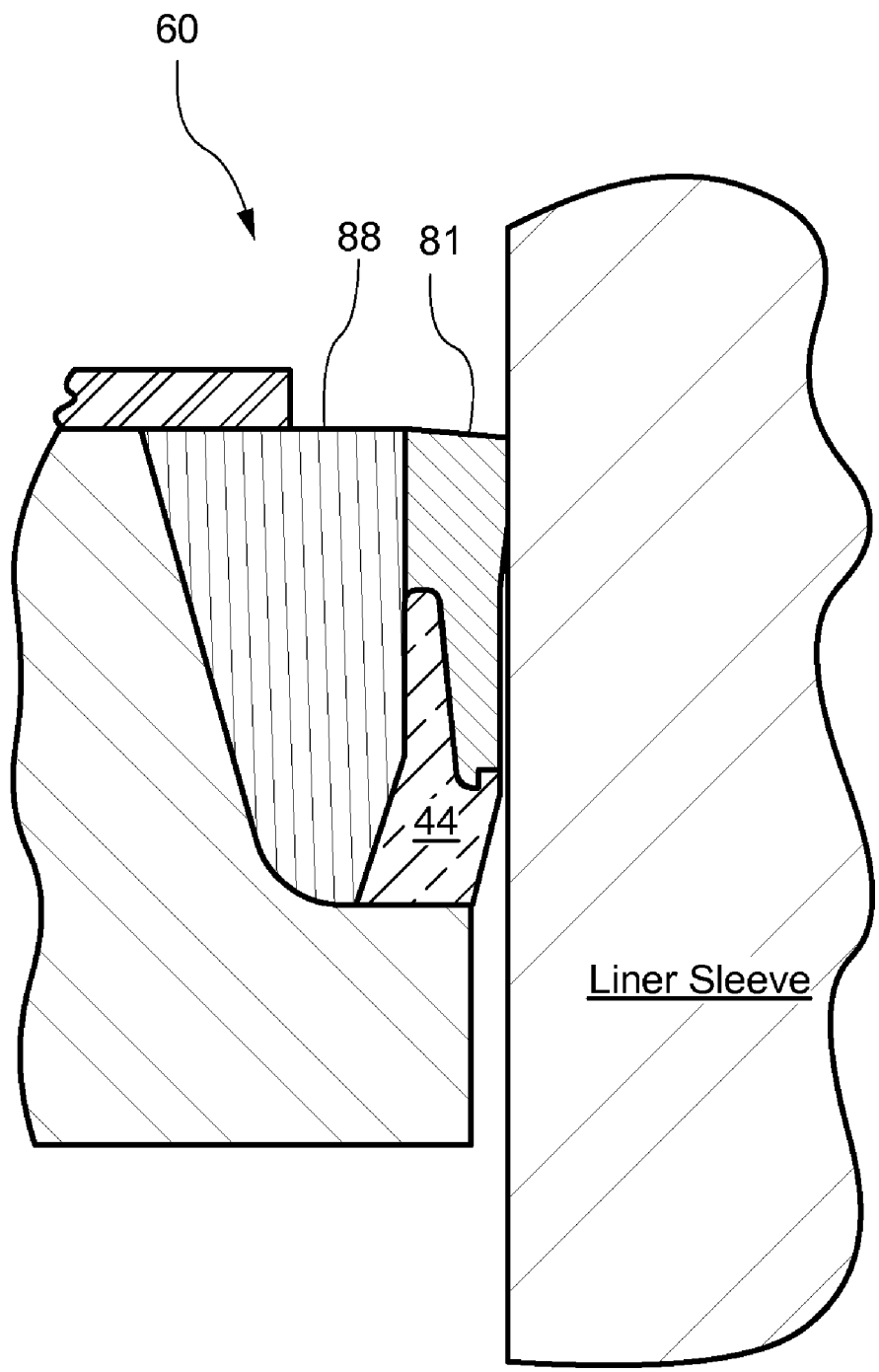
FIG. 6A is a partial longitudinal cross-sectional schematic view showing the relationship of piston hub and seal assembly of FIG. 4 and a liner sleeve, the piston hub and seal assembly being on its return (or low pressure) stroke, and the bearing ring being unexpanded.
Figure 6B:
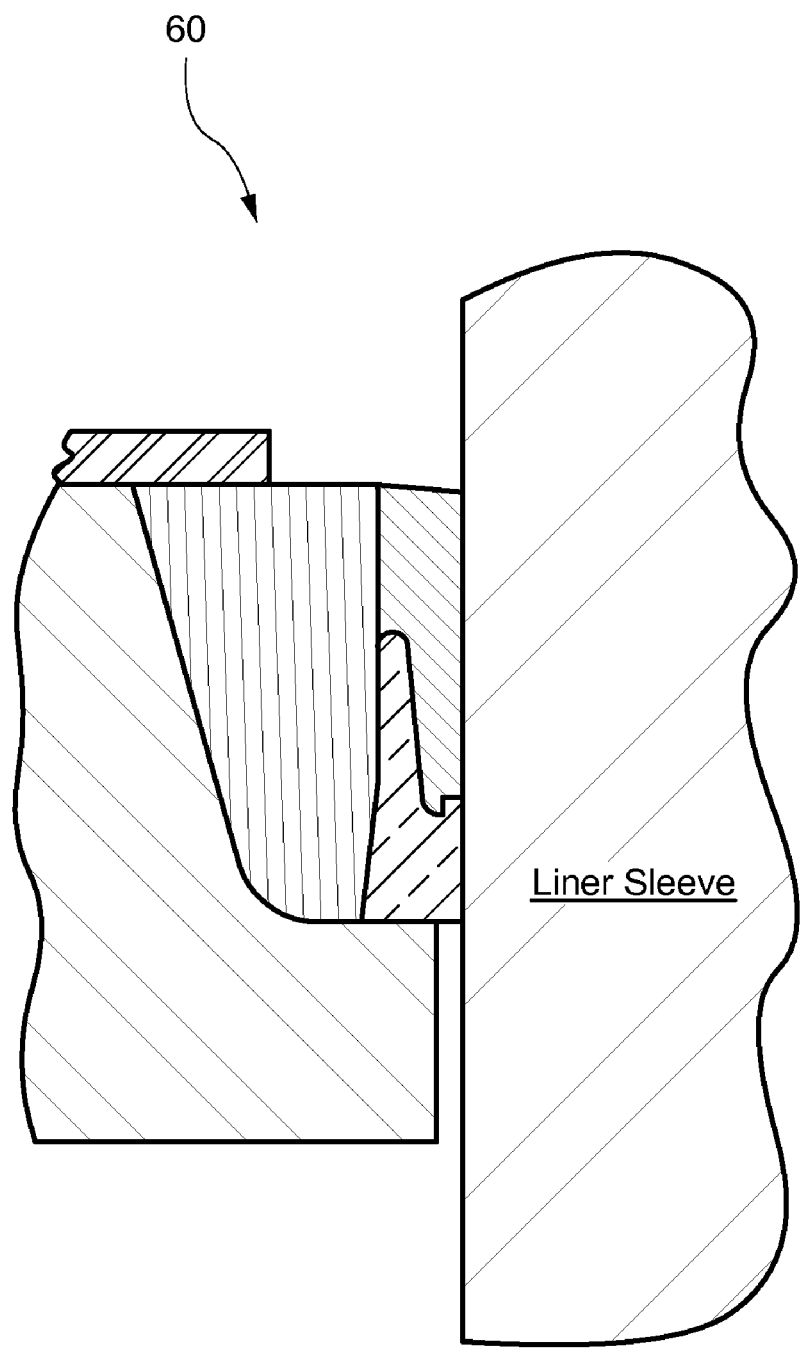
FIG. 6B is a partial longitudinal cross-sectional schematic view analogous in part to that of FIG. 6A but with the piston hub and seal assembly being on its pressure stroke and the bearing ring being radially expanded.
Figure 6C:
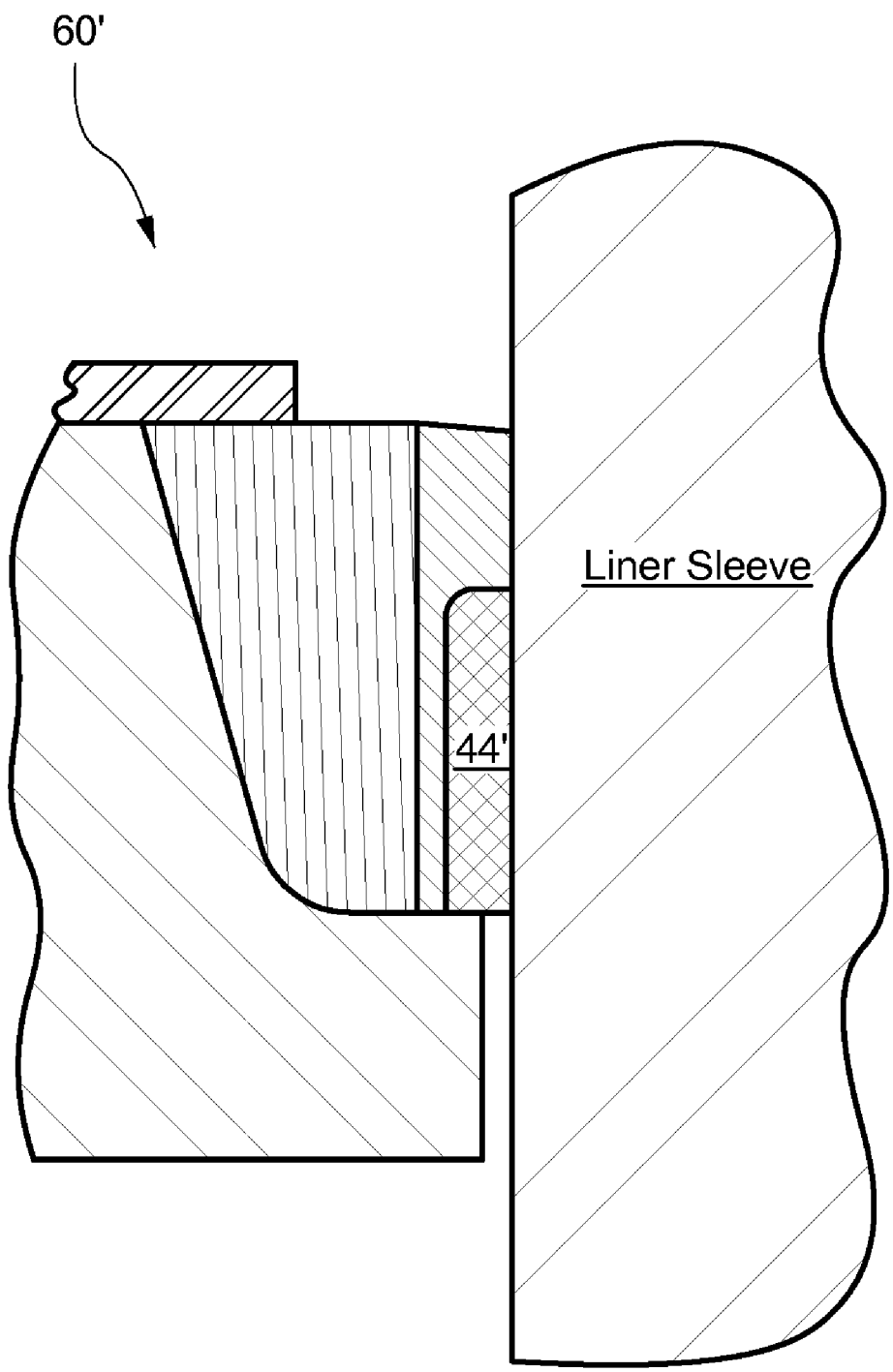
FIG. 6C is a partial longitudinal cross-sectional schematic view analogous in part to that of FIG. 6B but with the piston hub and seal assembly being on its pressure stroke and an alternate (cylindrical) bearing ring being radially expanded.

The invention also includes a piston within a cylinder, the piston comprising a piston hub and seal assembly as described herein. For example, see FIGS. 6A and 6B, which are partial longitudinal cross-sectional schematic views of a piston hub and seal assembly 60 within a cylinder. The cylinder portion in each figure is labeled liner sleeve (i.e., the liner sleeve portion of a liner). FIG. 6A shows piston hub and seal assembly 60 relatively unpressurized (i.e., not during a pressure stroke), first seal section 81, second seal section 88, and bearing ring 44 being shown in the same configurations illustrated in FIG. 4. In contrast, FIG. 6B shows piston hub and seal assembly 60 relatively pressurized (i.e., during a pressure stroke). Views of first seal section 81, second seal section 88, and bearing ring 44 seen unpressurized in FIGS. 4 and 6A may be compared with analogous views of these structures pressurized, as schematically represented in FIG. 6B. FIG. 6C is a partial longitudinal cross-sectional schematic view of a pressurized piston hub and seal assembly 60' within a cylinder, piston hub and seal assembly 60' being analogous in part to piston hub and seal assembly 60 except for the substitution of a cylindrical bearing ring 44' for bearing ring 44, with corresponding changes in the shapes of the first and second seal sections of piston hub and seal assembly 60 to accommodate cylindrical bearing ring 44'.

Regarding each of the embodiments of a piston hub and seal assembly described herein, unless otherwise specified the second seal section second polyurethane may be either bonded, or alternatively not bonded, to at least one circumferential seal retention area. Further, in any embodiment of a piston hub and seal assembly described herein the first seal section first polyurethane may be either bonded, or alternatively not bonded, to the second seal section second polyurethane along the intra-seal interface. In general, the first seal section may comprise polyurethane of about 95 durometer Shore A hardness to about 60 durometer Shore D hardness, while the second seal section comprises polyurethane of about 75 to about 85 durometer Shore A hardness. And in certain embodiments of the piston hub and seal assembly, at least one void (see, e.g., FIGS. 5A and 5B), or alternatively no void (see, e.g., FIGS. 3 and 4), extends radially between a portion of the second seal section and the circumferential seal retention area.

In each of the piston hub and seal assembly embodiments described herein, elastomers (e.g., polyurethanes) forming the first and second seal sections may be cast-in-place using certain methods to obtain desired seal properties. For example, the second seal section may be allowed to completely cure before the first seal section is cast in contact with it. Under such conditions, the first seal section will typically shrink tightly around the second seal section during curing. Thus, after curing of both the first and second seal sections, both seal sections will exhibit residual shrinkage stress which may be beneficial in certain applications as described herein. The magnitude of this residual shrinkage stress may be adjusted as a function of several variables, such as: elastomer composition, curing time, curing temperature, curing pressure, elastomer thickness, and the presence and distribution of voids in the elastomers. Illustrative examples of several optional mold configurations to facilitate production of piston hub and seal assemblies are described herein. Analogous configurations are known to those skilled in the art.

Figure 7:
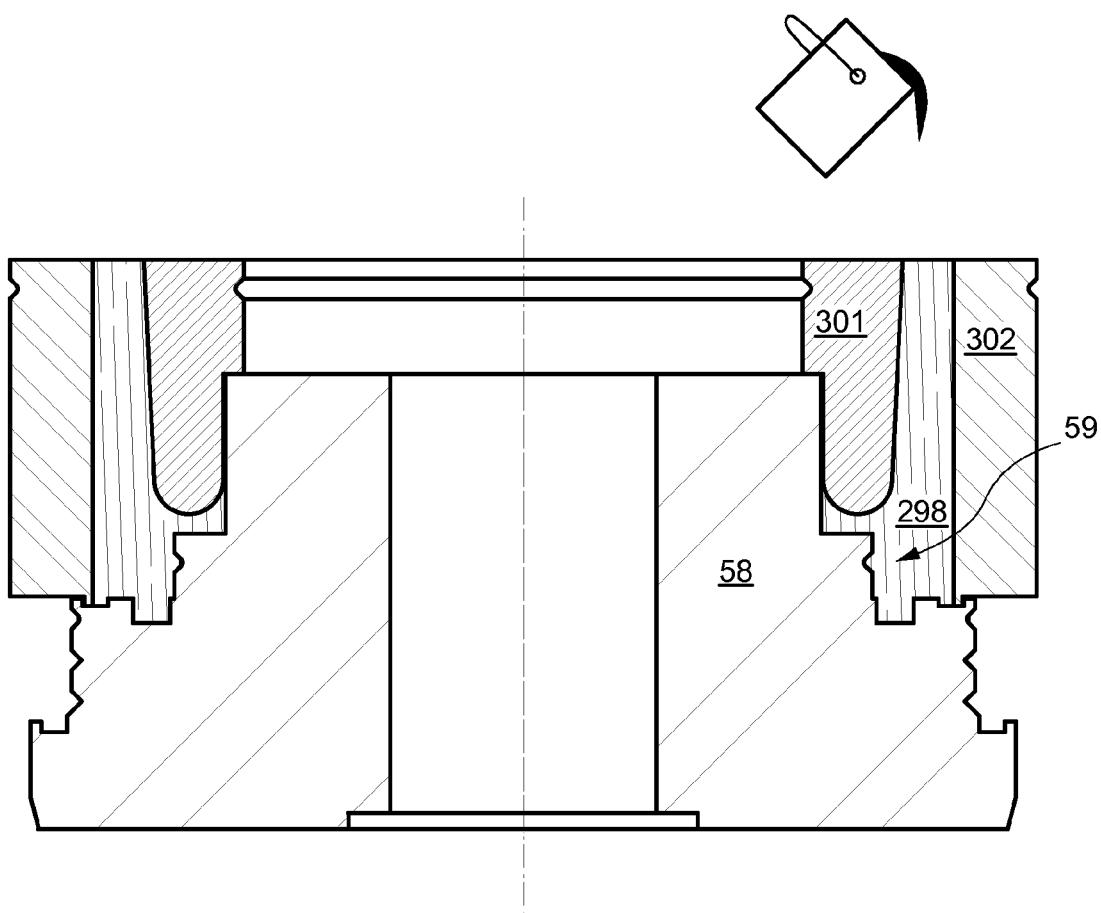
FIG. 7 schematically illustrates an optional first mold configuration and the casting of a second seal section of a hub-bonded dual-durometer seal for a piston hub and seal assembly.

FIG. 7 schematically illustrates an optional first mold configuration and the casting of a second seal section of a hub-bonded dual-durometer seal for a piston hub and seal assembly. The first mold configuration comprises coaxial inner and outer mold wall segments 301 and 302, the wall segments being radially spaced apart. Inferior portions of inner and outer mold wall segments 301 and 302 are temporarily joined by, and sealed against, an inferior wall comprising a portion of seal retention area 59 of hub 58. Superiorly, the space between wall segments 301 and 302 remains open for accepting poured liquid elastomer (typically comprising polyurethane) for casting a second seal section comprising elastomer 298. Hub bonding of the second seal section may be achieved through techniques known in the art such as surface preparation of seal retention area 59 and/or the application of one or more adhesive materials to seal retention area 59 prior to casting.

Figure 8:
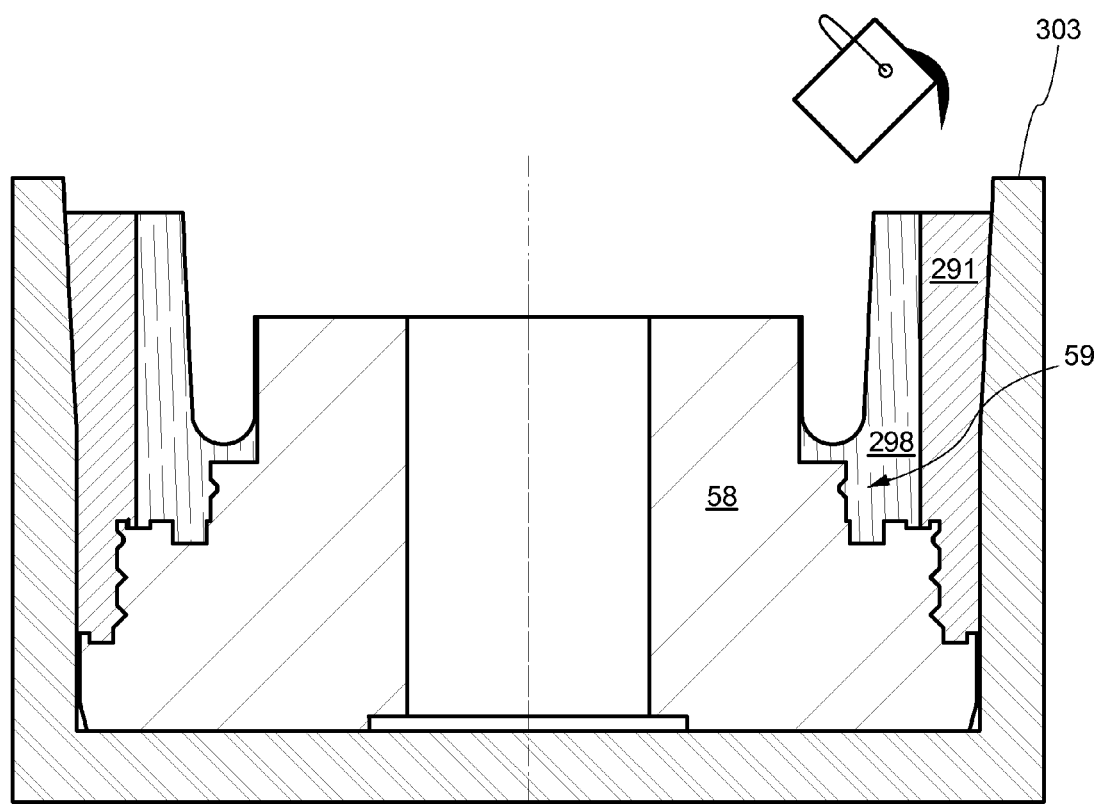
FIG. 8 schematically illustrates an optional second mold configuration and the casting of a first seal section of a hub-bonded dual-durometer seal for a piston hub and seal assembly.

FIG. 8 schematically illustrates an optional second mold configuration and the casting of a first seal section of a hub-bonded dual-durometer seal for a piston hub and seal assembly. The second mold configuration comprises an outer wall segment 303 coaxial with an inner wall segment comprising a peripheral portion of a previously cast-in-place (including curing) second seal section comprising elastomer 298, the inner and outer walls being radially spaced apart. Inferior portions of the inner and outer mold wall segments are temporarily joined by, and sealed against, an inferior wall comprising a portion of seal retention area 59 of hub 58. Superiorly, the space between the inner and outer wall segments remains open for accepting poured liquid elastomer 291 (typically comprising polyurethane) for casting a first seal section. Bonding of the first seal section to the second seal section is optional, depending on the embodiment, but may be achieved through techniques known in the art such as surface preparation of the intra-seal interface between the first and second seal sections and/or by the application of one or more adhesive materials to the intra-seal interface between the first and second seal sections.

Figure 9:
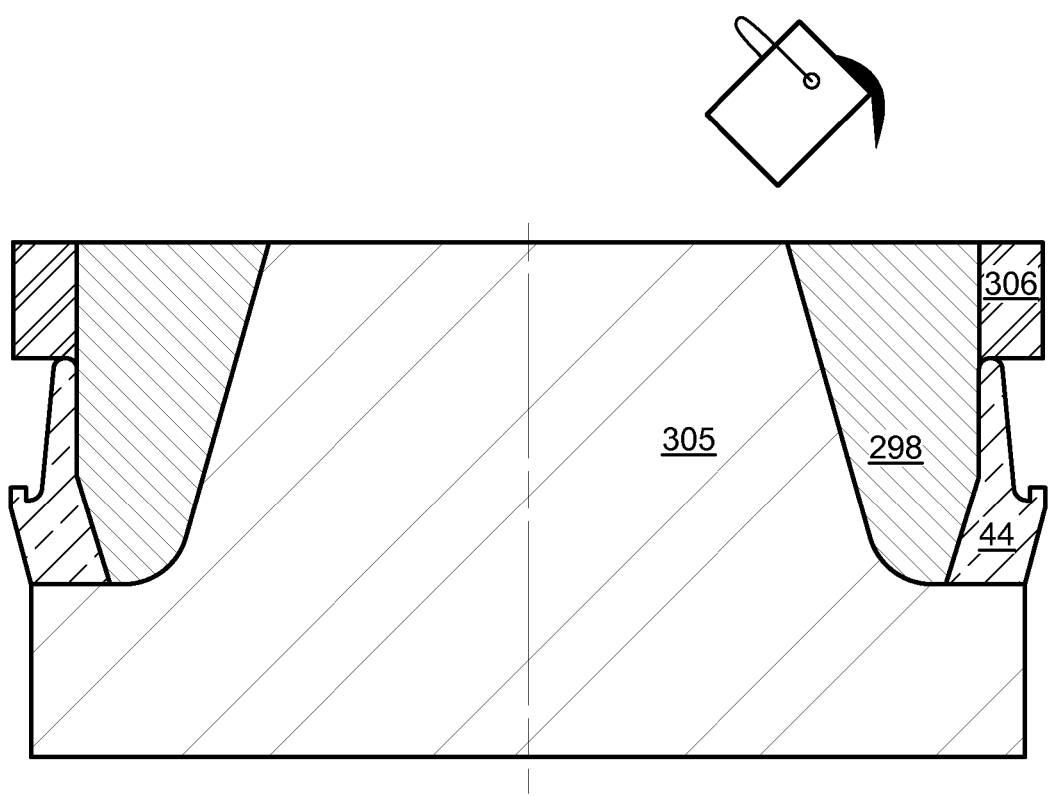
FIG. 9 schematically illustrates an optional third mold configuration and the casting of a second seal section of a replacement cup configuration of a dual-durometer seal (with a bearing ring) for a piston hub and seal assembly.

FIG. 9 schematically illustrates an optional third mold configuration and the casting of a second seal section of a replacement cup configuration of a dual-durometer seal (with a bearing ring) for a piston hub and seal assembly. The third mold configuration comprises an outer wall spaced apart from and coaxial with an inner wall comprising a part of mold portion 305 which is analogous to seal retention area 57 of hub 56. The outer mold wall comprises a mold ring 306 superiorly which is temporarily sealed against the superior extent of bearing ring 44. The inferior portion of bearing ring 44 contacts mold portion 305 as shown. Superiorly, the space between the inner and outer mold walls remains open for accepting poured liquid elastomer (typically comprising polyurethane) for casting a second seal section comprising elastomer 298. Hub bonding of this second seal section is unnecessary in replacement cup configurations.

Figure 10:
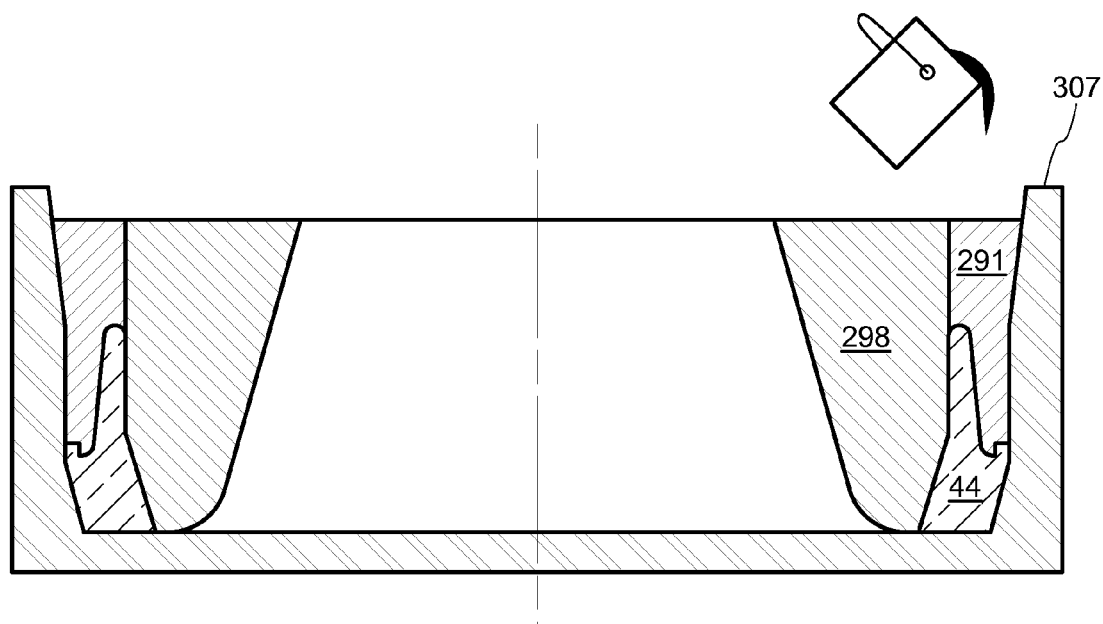
FIG. 10 schematically illustrates an optional fourth mold configuration and the casting of a first seal section of a replacement cup configuration of a dual-durometer seal (with a bearing ring) for a piston hub and seal assembly.

FIG. 10 schematically illustrates an optional fourth mold configuration and the casting of a first seal section of a replacement cup configuration of a dual-durometer seal (with a bearing ring) for a piston hub and seal assembly. The fourth mold configuration comprises an outer wall mold segment 307 coaxial with and spaced apart from an inner wall segment, the inner wall segment comprising a peripheral portion of a previously cast-in-place (including curing) second seal section comprising elastomer 298 and a portion of bearing ring 44, the inner and outer wall segments being radially spaced apart. Inferiorly, a portion of bearing ring 44 temporarily seals against outer wall mold segment 307. Superiorly, the space between the inner and outer wall segments remains open for accepting poured liquid elastomer (typically comprising polyurethane) for casting a first seal section comprising elastomer 291. Bonding of the first seal section comprising elastomer 291 to second seal section comprising elastomer 298 and/or to bearing ring 44 is optional, depending on the embodiment, but may be achieved through techniques known in the art such as surface preparation and/or by the application of one or more adhesive materials to surfaces to be bonded.

Note that after completion of casting methods schematically illustrated in FIGS. 7-10, portions of seal elastomer 291 and 298 will be trimmed to final configuration as shown in corresponding earlier figures.

Operation of a piston comprising a piston and seal assembly as described herein includes mounting the piston hub and seal assembly on a piston rod, the mounting functioning to retain the seal on the hub if such retention is necessary because the seal is not bonded to the hub. The piston's hub (typically comprising steel) typically comprises a proximal transverse flange and at least one circumferential seal retention area. The proximal transverse flange has a first outer diameter that is slightly less than a second diameter, which is the diameter of the first seal section cylindrical external surface portion and also the diameter of the circumferential bearing ring cylindrical external surface portion (if the ring is present). The second diameter, measured when the bearing ring (if present) is in an unstressed state (i.e., when the radial pressure differential across the bearing ring is approximately zero), is in turn slightly less than the liner sleeve inner diameter.

A central bore typically extends longitudinally through the hub's transverse flange and circumferential seal retention area(s) for accommodating a piston rod. The hub contacts the elastomeric seal and maintains the seal symmetrical about (i.e., coaxial with) the hub's longitudinal axis. The seal, in turn, maintains the bearing ring (if present) coaxial with, and spaced radially apart from, the circumferential seal retention area. Typically, the bearing ring extends distally from its base surface (in contact with the transverse flange).

When a piston is secured on a piston rod that passes through the piston hub's central bore, the piston hub's proximal transverse flange typically rests against a flange on the piston rod. The piston is held on the piston rod by a nut which screws on to the distal end of the rod, together with any necessary retainer plate(s).

To ensure that the elastomeric seal and bearing ring (if present) remain positioned as above with respect to the hub, the seal is molded to fit symmetrically about the hub's circumferential seal retention area (and thus to maintain its position symmetrically about the hub longitudinal axis). Note that the seal may be molded directly on the seal retention area (e.g., cast-in-place), with or without bonding (as with an adhesive layer) to the seal retention area's peripheral surface. If particularly tight coupling is desired between the seal and the seal retention area's peripheral surface, irregular peripheral surface features such as ribs and/or surface roughness may be used with or without an adhesive layer for increasing bond strength. In such a bonded piston configuration, piston maintenance requires replacement of the hub, seal and bearing ring (if present) together. Alternatively, the seal may be molded together with the bearing ring (if present) as a subassembly separate from the hub by using a mold portion analogous to the hub. In this latter configuration (replacement cup), a separately-molded subassembly consisting of the seal and bearing ring (if present) can be easily placed on a hub by stretching its diameter and then sliding it over the seal retention area. Note that either a cast-in-place subassembly or a separately molded subassembly can thus be closely fitted about a seal retention area peripheral surface, notwithstanding that surface is, for example, substantially cylindrical or frusto-conical.

When present, a bearing ring's cylindrical external surface portion facilitates four functions of the bearing ring. First, the bearing ring provides (in the proximal portion of its cylindrical external surface portion) a radially expandable surface for narrowing the extrusion gap. Second, when the extrusion gap is narrowed to zero (e.g., when the proximal portion of the bearing ring's cylindrical external surface portion expands radially sufficiently to contact a liner sleeve wall), the area of contact increases the total area of bearing surface between the piston hub and seal assembly and the liner sleeve (and thus reduces the force per unit area of bearing surface). See, for example, FIG. 6B. Third, the bearing ring conducts heat away from the heat-sensitive elastomeric seal material near the extrusion gap (and from the liner sleeve itself when the bearing ring contacts the liner sleeve). And fourth, adhesion of the seal elastomer to the distal portion of the bearing ring (and to any extrusion control groove that may be present) acts to reduce extrusion of the seal elastomer through the extrusion gap. Substantially cylindrical bearing rings (i.e., alternate bearing rings) have functions analogous to the first three functions listed above, while the fourth function is accomplished via adhesion of the seal elastomer to the bearing ring's distal end.

Depending on the material of which the bearing ring is constructed (e.g., metallic or filled-polymeric) and the parameters of the pump's intended use (e.g., fluid pressure, temperature, and particulate content), the bearing ring may have the general configuration of a relatively thin-walled cylinder (alternate bearing rings) or a more complex configuration comprising a cylindrical external surface portion having differently-shaped proximal and distal portions. As explained below, frictional heat flow differs materially in these two bearing ring configurations. Further, a relatively thin-walled and generally cylindrical bearing ring of filled-polymeric facilitates certain maintenance operations.

A bearing ring with differently-shaped proximal and distal portions has an inner surface and a cylindrical external surface portion that extend between a base surface and a distal end. The bearing ring's cylindrical external surface portion comprises a proximal bearing ring outer surface and a distal bearing ring outer surface separated by a peripheral bearing ring contact surface. The distal bearing ring outer surface may, in some embodiments, comprise an extrusion control groove 43 located radially inward from the peripheral bearing ring contact surface (see, e.g., FIG. 4). When present, such an extrusion control groove provides added surface area for bonding a piston's elastomeric seal to reduce seal extrusion. An extrusion control groove also provides a mechanical stop for further controlling movement of seal elastomer to further reduce seal extrusion. Further control of seal extrusion can be obtained by increasing adhesion of seal elastomer where it contacts portions of a bearing ring. In particular, test specimens of seal elastomer have demonstrated unexpectedly strong adhesion to specimens of a filled-polymer bearing ring comprising polyamide and molybdenum disulfide, without the use of separate adhesive agents.

When a bearing ring having a cylindrical external surface portion is not under a radial pressure differential, the peripheral bearing ring contact surface has a diameter slightly less than the liner sleeve's inner diameter. As used herein, the term salient as applied herein to the bearing ring's outer surface means projecting generally outward (in a manner analogous to the profile of, e.g., a salient in a trench line). Thus, the longitudinal profile of the bearing ring's cylindrical external surface portion may comprise smoothly-curved, angular, and/or cylindrical areas, as well as relatively small indentations and/or protuberances for achieving desired bearing ring radial expansion properties as a function of radial differential pressures applied to the bearing ring inner and outer surfaces.

Radial differential pressures acting on a bearing ring are functions of the pressure of fluid(s) being pumped and the ring configuration. During a pump pressure stroke, the proximal portion of a bearing ring having a cylindrical external surface portion will experience a relatively large differential pressure tending to expand the ring, whereas the distal portion will experience a relatively smaller differential pressure leading to a smaller expansion. That is, the bearing ring will tend to flare out proximally, eventually leading to an increase in the area of contact between the outer surface of the bearing ring's proximal portion and the liner. In contrast, a pump pressure stroke will tend to expand a cylindrical bearing ring substantially uniformly, eventually leading to contact between the liner and virtually the entirety of the bearing ring's cylindrical outer surface.

In each high pressure piston of the present invention comprising a bearing ring having a cylindrical external surface portion, the four bearing ring functions noted above combine to extend piston service life. To facilitate these functions, each bearing ring proximal portion comprises an elastic material (e.g., metallic or filled-polymer) having heat conductivity sufficient to dissipate frictional heat, together with a low modulus of elasticity compared to the liner wall. A relatively low coefficient of friction for the bearing ring against the liner wall is desirable (compared to the coefficient of friction of either the hub transverse flange or the elastomeric seal on the liner wall). If the liner wall is steel, a material such as, for example, bronze would be an appropriate choice for the bearing ring. This is because the modulus of elasticity of various bronze compositions ranges from about 14,000,000 psi to about 19,000,000 psi, which is substantially less than that of steel (about 30,000,000 psi). Thus, under high pressure (e.g., during a pump's pressure stroke) the proximal portion of a bronze bearing ring of the present invention tends to expand elastically toward contact with the liner wall (thus narrowing the extrusion gap). The mechanism of this expansion is discussed below. Further, finite element analysis (FEA) of the bearing ring expansion shows that a bronze bearing ring of the present invention would not be stressed past its yield point during its periodic expansion toward the liner wall. That is, the ring's diameter would not tend to increase permanently (i.e., to creep outward as in plastic deformation). Instead, the bearing ring diameter would tend to contract elastically to its original (i.e., substantially unstressed) dimension when high pressure is removed (i.e., on the pump's return stroke).

An alternative material such as, for example, a filled-polymer comprising polyamide and molybdenum disulfide, would also be an appropriate choice for the bearing ring. This is because the tensile modulus of, for example, various filled polyamide compositions ranges from about 400,000 psi to about 500,000 psi, which is also substantially less than that of steel. Under high pressure (e.g., during a pump's pressure stroke) the proximal portion of a filled polymer bearing ring of the present invention tends to expand by yielding toward contact with the liner wall. That is, the ring's diameter would tend to creep outward as in plastic deformation, thus narrowing or closing the extrusion gap.

The distal portion of a bearing ring having a cylindrical external surface portion is embedded in (and optionally bonded via an adhesive layer to) the elastomeric piston seal material that periodically (i.e., during a pump's pressure stroke) is subjected to high pressure that forces the elastomeric seal into close sliding contact with the liner wall. Because of adhesion between the distal portion of the bearing ring's cylindrical external surface portion and the elastomeric seal material in which it is embedded, the elastomeric seal material between that outer wall portion and the liner (that is, elastomeric material near the extrusion gap), is inhibited from extruding through the gap. Frictional heat generated by the piston sealing material's sliding contact with the liner wall near the extrusion gap tends to be conducted away from the extrusion gap by the bearing ring. A bronze bearing ring tends to generate more frictional heat than a filled-polymer bearing ring, but because of the relatively high coefficient of heat transmission of bronze (roughly ten times that of steel), this frictional heat is conducted by the bearing ring to the proximal flange of the piston (which the bearing ring base surface contacts). The proximal flange, in turn, may itself be cooled by a water spray on its proximal surface (i.e., on the back of the piston). Such efficient dissipation of frictional heat via the bearing ring and proximal flange tends to decrease the tendency of the piston elastomeric seal material to flow under pressure like a viscous fluid, thereby decreasing extrusion of the seal material through the gap between piston and liner wall.

As noted above, extrusion of piston elastomeric seal material may also reduced by piston hub and seal assemblies because, as pressure on the seal material increases during a pump's pressure stroke, this rising pressure also tends to cause radial expansion of the bearing ring. Such expansion takes place in the proximal portion of a bearing ring having a cylindrical external surface portion or, in alternative embodiments, along the entire length of a bearing ring having a cylindrical outer surface. The amount of such radial expansion is a function of the pressure of the pumped fluid, which is applied directly to the distal end of the piston's elastomeric seal. This pressure is transmitted hydraulically by the elastomeric seal material (acting as a viscous fluid) to the inner surface of the bearing ring. Since the proximal portion of a bearing ring's cylindrical external surface portion or, alternatively, the entirety of a bearing ring's cylindrical outer surface, is not in contact with the elastomeric seal material, the result is a net radial outward force on the proximal portion of the former bearing ring or, alternatively, a net radial outward force on the entire length of the latter bearing ring. Other factors affecting the amount of radial elastic expansion of a bearing ring include the compliance of the bearing ring in response to the net outward radial force, as well as the width of the extrusion gap into which the bearing ring elastically expands. (Note that the extrusion gap tends to widen as the liner wears).

Radial expansion of the bearing ring narrows the extrusion gap during the pump pressure stroke, counteracting the increased tendency of the seal elastomer to extrude into the gap under the relatively higher pressures on the seal elastomer that are developed during the pressure stroke. On the return stroke, in contrast, the pressure of the pumped fluid (and thus pressure on the seal elastomer) is relatively lower. This lower pressure leads to widening of the extrusion gap due to elastic radial contraction of the bearing ring. Notwithstanding the wider extrusion gap however, the tendency of the seal elastomer to extrude into the gap is simultaneously reduced as a function of the relatively lower pressure of the pumped fluid (and therefore the relatively lower pressure on the elastomeric seal) during the return stroke. Thus, a high pressure piston of the present invention adapts to both changes in operating pressure and to liner wear in reducing seal extrusion through periodic expansion of its bearing ring to narrow the extrusion gap.

When high pressure acts on the elastomeric seal of a piston hub and seal assembly, the behavior of the seal's elastomeric material becomes analogous to that of an exceptionally thick viscous fluid. Actual bulk movement of the elastomeric seal material is substantially restricted by its inherent shape-retaining properties (as seen in, e.g., relatively stiff urethanes) and/or by reinforcing components within the elastomeric material such as fabric and/or relatively stiffer urethanes (not shown). But where very little movement is allowed (e.g., on the order of hundred's of microns) in any of the structures restraining the elastomeric seal material, pressure applied to the distal end of the seal during a piston pressure stroke (typically several thousand psi) tends to be transmitted hydraulically (i.e., substantially undiminished in all directions) throughout the elastomeric seal material. Thus, pressurized elastomeric seal material contacting the inner surface of the bearing ring will exert a net outward pressure tending to expand or flare out the bearing ring. The pressure magnitude will nearly equal that of the pressure applied to the distal end of the seal during the piston pressure stroke. The net outwardly-directed pressure results from the fact that the opposing pressure on the cylindrical outer bearing ring surface or on the proximal area of the cylindrical external surface portion of the bearing ring will approximate atmospheric pressure (typically less than 15 psi) if the proximal end of the liner is open to the atmosphere (see, e.g., FIG. 1). Regardless of a piston's position within the liner, this opposing pressure proximal to the piston quickly equalizes through the space separating the piston's transverse flange and the liner wall with ambient pressure proximal to the piston.

What is claimed is:

1. A piston hub and seal assembly having a longitudinal axis, said piston hub and seal assembly comprising:
   a piston hub substantially symmetrical about said longitudinal axis, said piston hub having at least one circumferential seal retention area; and
   an elastomeric seal cast-in-place in at least one said circumferential seal retention area, each said elastomeric seal being substantially symmetrical about said longitudinal axis and comprising:
      a first seal section having a cylindrical external surface portion adjacent to a frusto-conical external surface portion, said first seal section comprising a first polyurethane; and
      a second seal section, at least a portion of said second seal section lying radially between one said circumferential seal retention area and at least a portion of said first seal section, said second seal section contacting said first seal section along a substantially non-planar intra-seal interface, and said second seal section comprising a second polyurethane having a lower modulus than said first polyurethane;
   wherein said first seal section frusto-conical external surface portion is angled outwardly about 3 degrees to about 7 degrees with respect to said adjacent first seal section cylindrical external surface portion; and
   wherein said intra-seal interface comprises a cylindrical portion substantially coaxial with said first seal section cylindrical external surface portion.

2. The piston hub and seal assembly of claim 1, wherein said second seal section second polyurethane is not bonded to said at least one circumferential seal retention area.

3. The piston hub and seal assembly of claim 1, wherein said second seal section second polyurethane is bonded to at least one said circumferential seal retention area.

4. The piston hub and seal assembly of claim 1, wherein said first seal section first polyurethane is bonded to said second seal section second polyurethane along said intra-seal interface.

5. The piston hub and seal assembly of claim 1, wherein said first seal section first polyurethane is not bonded to said second seal section second polyurethane along said intra-seal interface.

6. The piston hub and seal assembly of claim 1, wherein said first seal section comprises polyurethane of about 95 durometer Shore A hardness to about 60 durometer Shore D hardness.

7. The piston hub and seal assembly of claim 6, wherein said second seal section comprises polyurethane of about 75 to about 85 durometer Shore A hardness.

8. A piston within a cylinder, said piston comprising the piston hub and seal assembly of claim 7.

9. The piston hub and seal assembly of claim 1, wherein at least one void extends radially between a portion of said second seal section and said circumferential seal retention area.

10. The piston hub and seal assembly of claim 1, wherein no void extends radially between said second seal section and said circumferential seal retention area.

11. A piston within a cylinder, said piston comprising the piston hub and seal assembly of claim 1.

12. A piston hub and seal assembly having a longitudinal axis, said piston hub and seal assembly comprising:
   a piston hub substantially symmetrical about said longitudinal axis, said piston hub having at least one circumferential seal retention area; and
   an elastomeric seal cast-in-place in at least one said circumferential seal retention area, each said elastomeric seal being substantially symmetrical about said longitudinal axis and comprising:
      a first seal section having a cylindrical external surface portion adjacent to a frusto-conical external surface portion, said first seal section comprising a first polyurethane;
      a second seal section, at least a portion of said second seal section lying radially between one said circumferential seal retention area and at least a portion of said first seal section, said second seal section contacting said first seal section along a substantially non-planar intra-seal interface, and said second seal section comprising a second polyurethane having a lower modulus than said first polyurethane; and
      a circumferential bearing ring partially embedded coaxially in said first seal section, said circumferential bearing ring having a cylindrical external surface portion;
   wherein said first seal section frusto-conical external surface portion is angled outwardly about 3 degrees to about 7 degrees with respect to said adjacent first seal section cylindrical external surface portion; and
   wherein said intra-seal interface comprises a frusto-conical portion substantially coaxial with said first seal section cylindrical external surface portion.

13. The piston hub and seal assembly of claim 12, wherein said first seal section first polyurethane is not bonded with said second seal section second polyurethane.

14. The piston hub and seal assembly of claim 12, wherein said first seal section first polyurethane is bonded with said second seal section second polyurethane along said intra-seal interface.

15. The piston hub and seal assembly of claim 12, wherein said first seal section comprises polyurethane of about 95 durometer Shore A hardness to about 60 durometer Shore D hardness.

16. The piston hub and seal assembly of claim 15, wherein said second seal section comprises polyurethane of about 75 to about 85 durometer Shore A hardness.

17. A piston within a cylinder, said piston comprising the piston hub and seal assembly of claim 16.

18. A piston within a cylinder, said piston comprising the piston hub and seal assembly of claim 12.

19. The piston hub and seal assembly of claim 12, wherein said circumferential bearing ring comprises bronze.

20. A piston hub and seal assembly having a longitudinal axis, said piston hub and seal assembly comprising:
    a piston hub substantially symmetrical about said longitudinal axis, said piston hub having at least one circumferential seal retention area; and
    an elastomeric seal cast-in-place in at least one said circumferential seal retention area, each said seal being substantially symmetrical about said longitudinal axis and comprising:
        a first seal section having a cylindrical external surface portion adjacent to a frusto-conical external surface portion, said first seal section comprising a first polyurethane; and
        a second seal section, at least a portion of said second seal section lying radially between one said circumferential seal retention area and said first seal section, said second seal section contacting said first seal section along an intra-seal interface and comprising a second polyurethane having a lower modulus than said first polyurethane;
    wherein said intra-seal interface comprises a substantially non-planar portion coaxial with said piston hub.

21. A piston hub and seal assembly having a longitudinal axis, the piston hub and seal assembly comprising:
    a piston hub having at least one circumferential seal retention area that is substantially symmetrical about the longitudinal axis; and
    an elastic seal positioned at least partially adjacent the at least one circumferential seal retention area of the piston hub and being substantially symmetrical about the longitudinal axis, the elastomeric seal comprising:
        a first seal section having a cylindrical external surface portion and a frusto-conical external surface portion, the first seal section having a first hardness; and
        a second seal section, at least a portion of the second seal section positioned between the at least one circumferential seal retention area of the piston hub and the first seal section,
    wherein the second seal section contacts the first seal section at an interface, and the second seal section having a second hardness that is less hard than the first hardness;
    wherein the frusto-conical external surface portion of the first seal section is angled outwardly with respect to the cylindrical external surface portion of the first seal section; and
    wherein at least a portion of the interface where the first seal section contacts the second seal section includes a cylindrical portion substantially coaxial with at least a portion of the external surface portion of the first seal section.

22. The piston hub and seal assembly according to claim 21, wherein at least a portion of the elastic seal is an elastomeric seal.

23. The piston hub and seal assembly according to claim 21, wherein at least a portion of the elastic seal is a polymer seal.

24. The piston hub and seal assembly according to claim 21, wherein at least a portion of the elastic seal is a polyurethane seal.

25. The piston hub and seal assembly according to claim 24, wherein the elastic seal is at least partially cured in place.

26. The piston hub and seal assembly according to claim 21, wherein at least a portion of the interface where the first seal section contacts the second seal section includes a curved portion that is coaxial with the piston hub about the longitudinal axis.

27. The piston hub and seal assembly according to claim 21, further comprising:
    a circumferential bearing ring having a cylindrical external surface portion that is positioned adjacent a portion of an external portion of the first seal section.

28. The piston hub and seal assembly according to claim 21, wherein the frusto-conical external surface portion of the first seal section is at least partially angled outwardly at an angle that is equal to or less than about 7 degrees with respect to the cylindrical external surface portion of the first seal section.

29. A piston hub and seal assembly having a longitudinal axis, the piston hub and seal assembly comprising:
    a piston hub having at least one circumferential seal retention area that is substantially symmetrical about the longitudinal axis;
    an elastomeric seal positioned at least partially adjacent the at least one circumferential seal retention area of the piston hub and being substantially symmetrical about the longitudinal axis, the elastomeric seal comprising:
        a first seal section having a cylindrical external surface portion and a frusto-conical external surface portion, wherein the first seal section includes a first polyurethane; and
        a second seal section, at least a portion of the second seal section positioned between the at least one circumferential seal retention area of the piston hub and the first seal section, wherein the second seal section contacts the first seal section at an interface, and the second seal section includes a second polyurethane having a lower modulus than the first polyurethane;
    a circumferential bearing ring having a cylindrical external surface portion that is positioned adjacent a portion of an external portion of the first seal section of the elastomeric seal;
    wherein the frusto-conical external surface portion of the first seal section of the elastomeric seal is angled outwardly with respect to the cylindrical external surface portion of the first seal section; and
    wherein at least a portion of the interface where the second seal section contacts the first seal section includes a portion that is coaxial with the piston hub about the longitudinal axis.

30. The piston hub and seal assembly according to claim 29, wherein at least a portion of the elastomeric seal is at least partially cured in place.

31. A piston hub and seal assembly having a longitudinal axis, the piston hub and seal assembly comprising:
    a piston hub having at least one circumferential seal retention area that is substantially symmetrical about the longitudinal axis; and
    an elastomeric seal positioned at least partially adjacent the at least one circumferential seal retention area of the piston hub and being substantially symmetrical about the longitudinal axis, the elastomeric seal comprising:
- a first seal section having a cylindrical external surface portion and a frusto-conical external surface portion, wherein the first seal section includes a first polyurethane; and
- a second seal section, at least a portion of the second seal section positioned between the at least one circumferential seal retention area of the piston hub and the first seal section, wherein the second seal section contacts the first seal section at an interface, and the second seal section includes a second polyurethane having a lower modulus than the first polyurethane; and wherein at least a portion of the interface where the second seal section contacts the first seal section includes a portion coaxial with the piston hub about the longitudinal axis.

32. The piston hub and seal assembly according to claim 31, wherein at least a portion of the elastomeric seal is at least partially cast-in-place.

33. The piston hub and seal assembly according to claim 31, wherein at least a portion of the elastomeric seal is at least partially cured in place.

34. The piston hub and seal assembly according to claim 31, wherein at least a portion of the interface where the second seal section contacts the first seal section includes a substantially non-planar portion coaxial with the piston hub.

35. The piston hub and seal assembly according to claim 31, wherein at least a portion of the interface where the second seal section contacts the first seal section includes a curved portion substantially coaxial with the cylindrical external surface portion of the first seal section.

* * * * *

UNITED STATES PATENT AND TRADEMARK OFFICE
CERTIFICATE OF CORRECTION

| | | |
|---|---|---|
| PATENT NO. | : 8,312,805 B1 | Page 1 of 1 |
| APPLICATION NO. | : 12/390518 | |
| DATED | : November 20, 2012 | |
| INVENTOR(S) | : George H. Blume | |

It is certified that error appears in the above-identified patent and that said Letters Patent is hereby corrected as shown below:

In the Claims:

At column 21, claim number 21, line number 45, replace the word [elastomeric] with -- elastic --.

Signed and Sealed this
Thirteenth Day of August, 2013

Teresa Stanek Rea
*Acting Director of the United States Patent and Trademark Office*